May 13, 1969

R. P. POSEY ET AL 3,443,533

GARMENT HANDLING DEVICE FOR AUTOMATICALLY
PERFORMING SPACED SUCCESSIVE
SEWING OPERATIONS

Filed July 5, 1966

INVENTORS
ROBERT P. POSEY
& PRICE C. FAW.

BY Bailey + Dority
ATTORNEYS

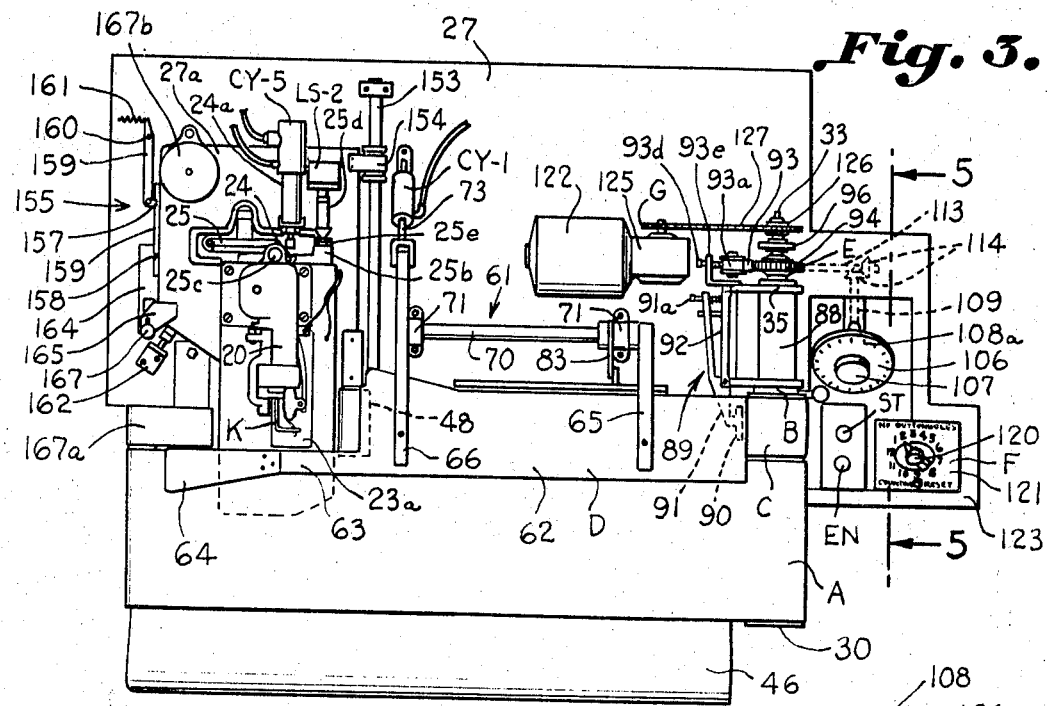

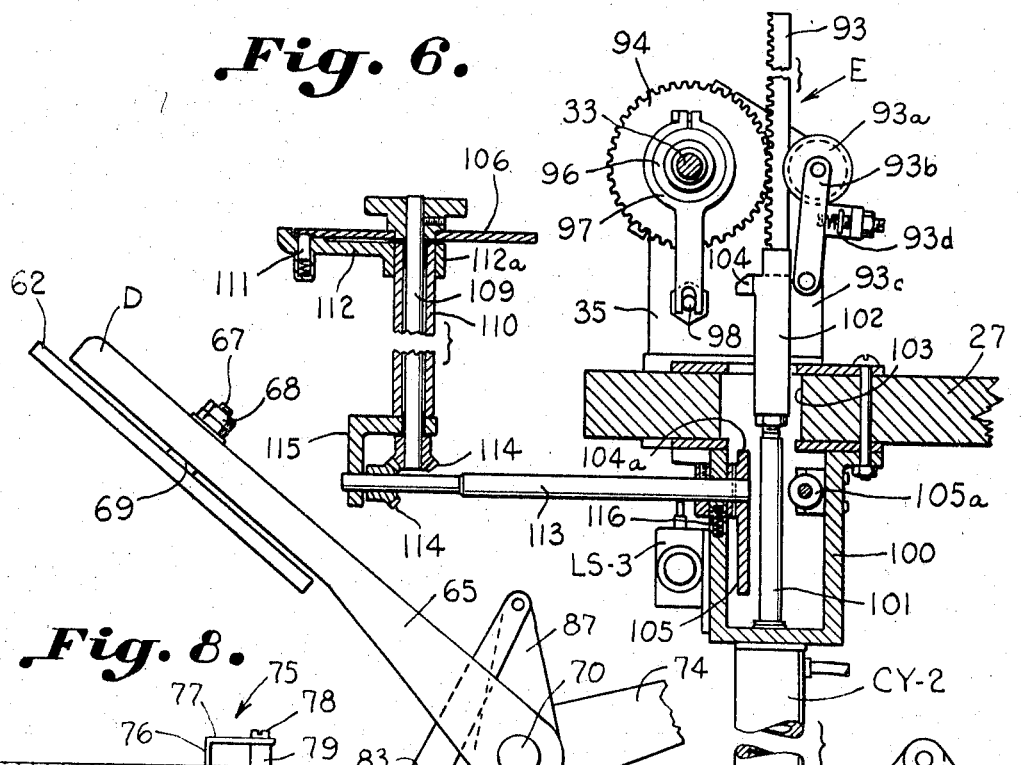
Fig. 6.
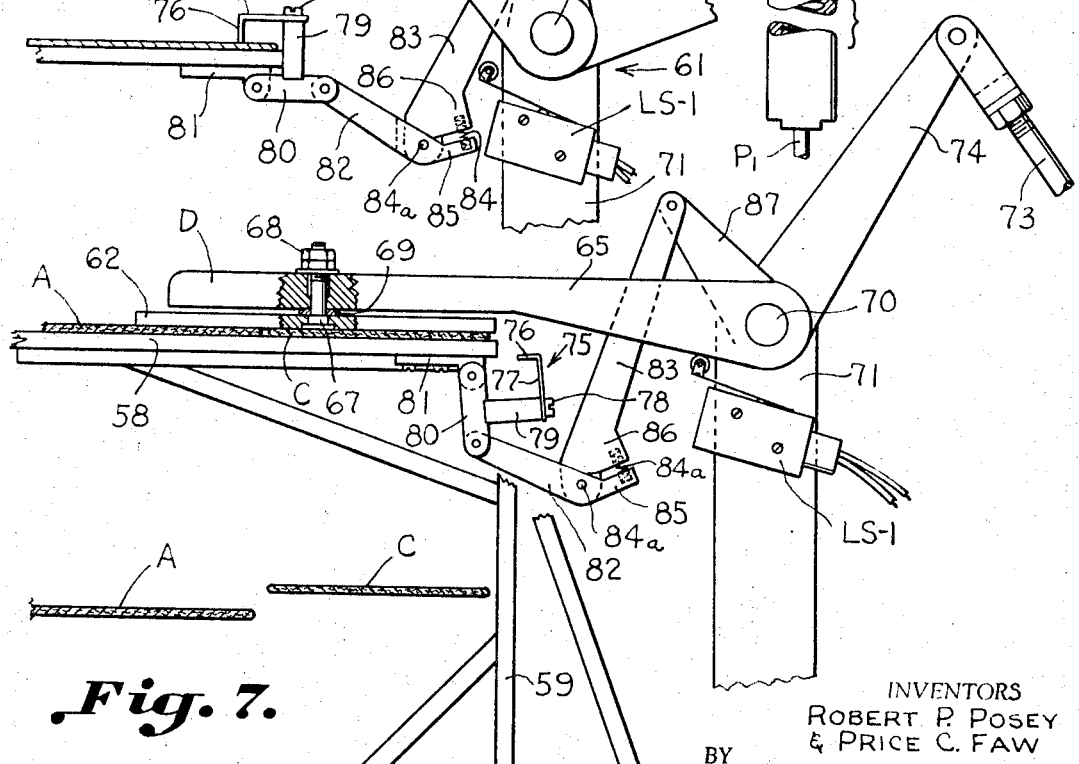
Fig. 8.
Fig. 7.
INVENTORS
ROBERT P. POSEY
& PRICE C. FAW
BY Bailey + Doxity
ATTORNEYS

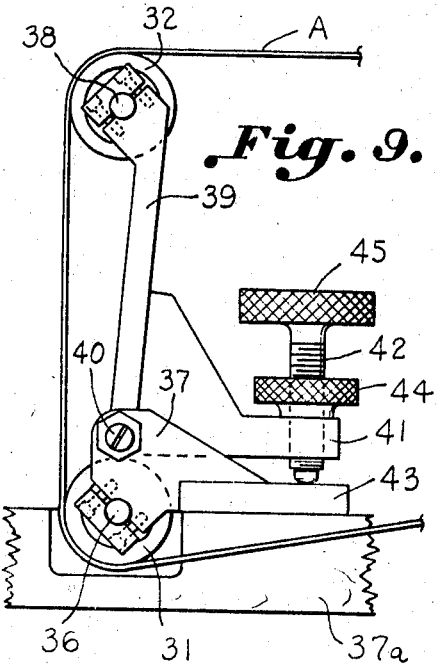
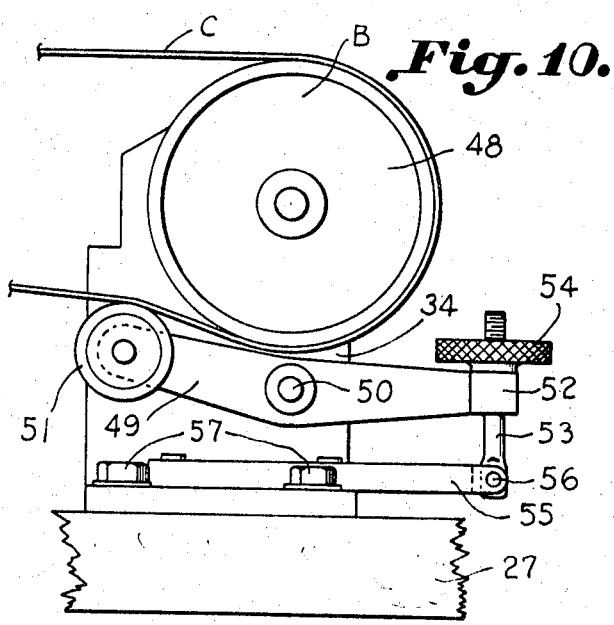
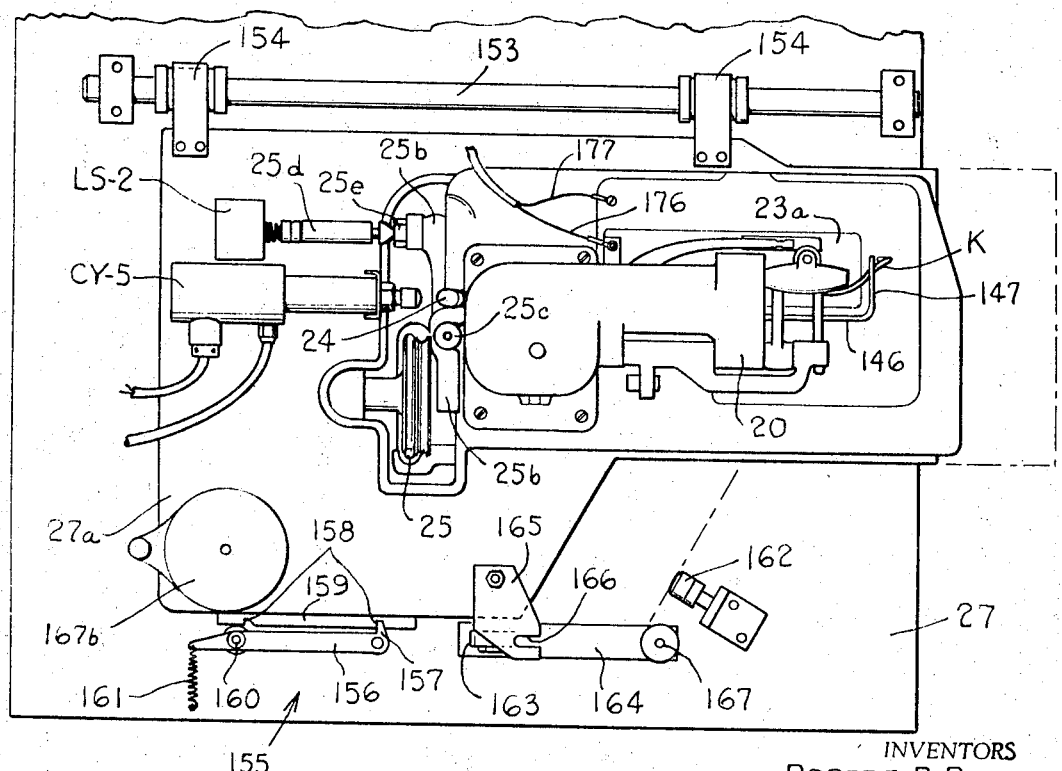
Fig. 9.
Fig. 10.
Fig. 11.
INVENTORS
ROBERT P. POSEY
& PRICE C. FAW
BY
Bailey + Dority
ATTORNEYS INVENTOR.
ROBERT P. POSEY
& PRICE C. FAW
BY
Bailey + Dority
ATTORNEY

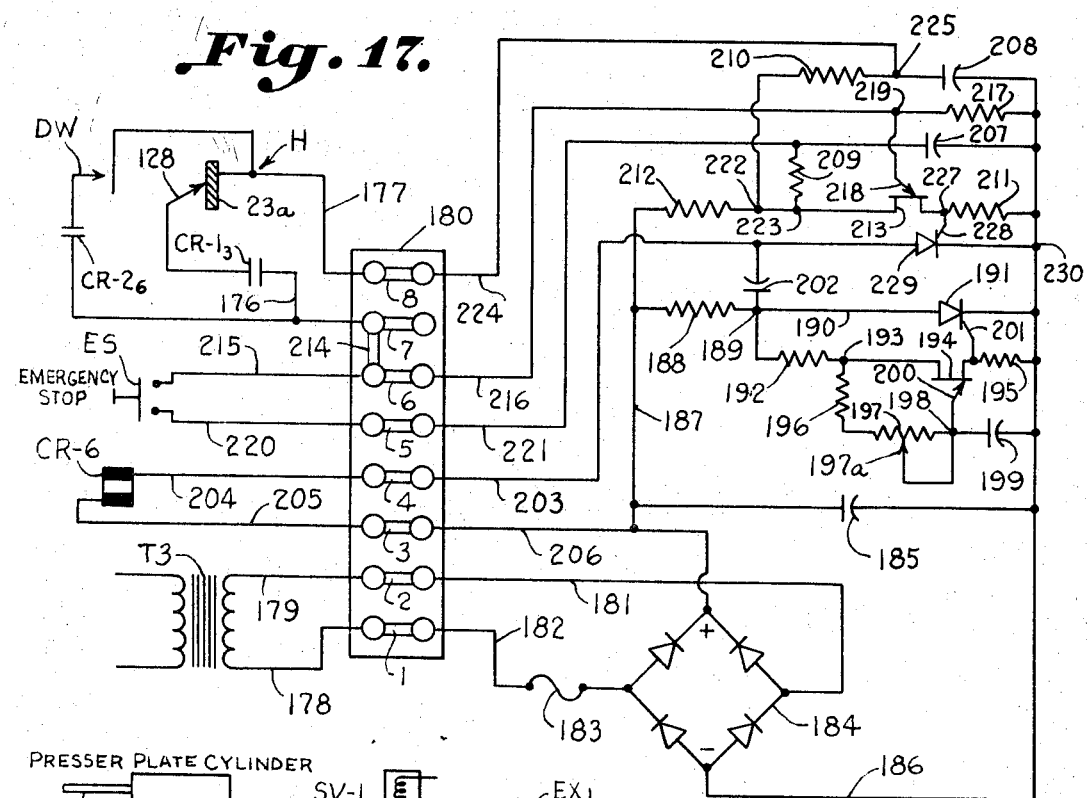

United States Patent Office 3,443,533
Patented May 13, 1969

3,443,533
GARMENT HANDLING DEVICE FOR AUTOMATICALLY PERFORMING SPACED SUCCESSIVE SEWING OPERATIONS
Robert P. Posey, Greenville, and Price C. Faw, Piedmont, S.C., assignors to Stone Manufacturing Co. Inc., Greenville, S.C., a corporation of South Carolina
Filed July 5, 1966, Ser. No. 562,828
Int. Cl. D05b 23/00, 27/00
U.S. Cl. 112—2         13 Claims

ABSTRACT OF THE DISCLOSURE

A garment handling device for automatically performing spaced successive sewing operations on a garment. Means are provided for setting the spacing between successive sewing operations, as well as the number of consecutive sewing operations so that once the garment is placed on the conveyor such is automatically shifted under the sewing machine for performing the sewing operations.

---

Figure 1:
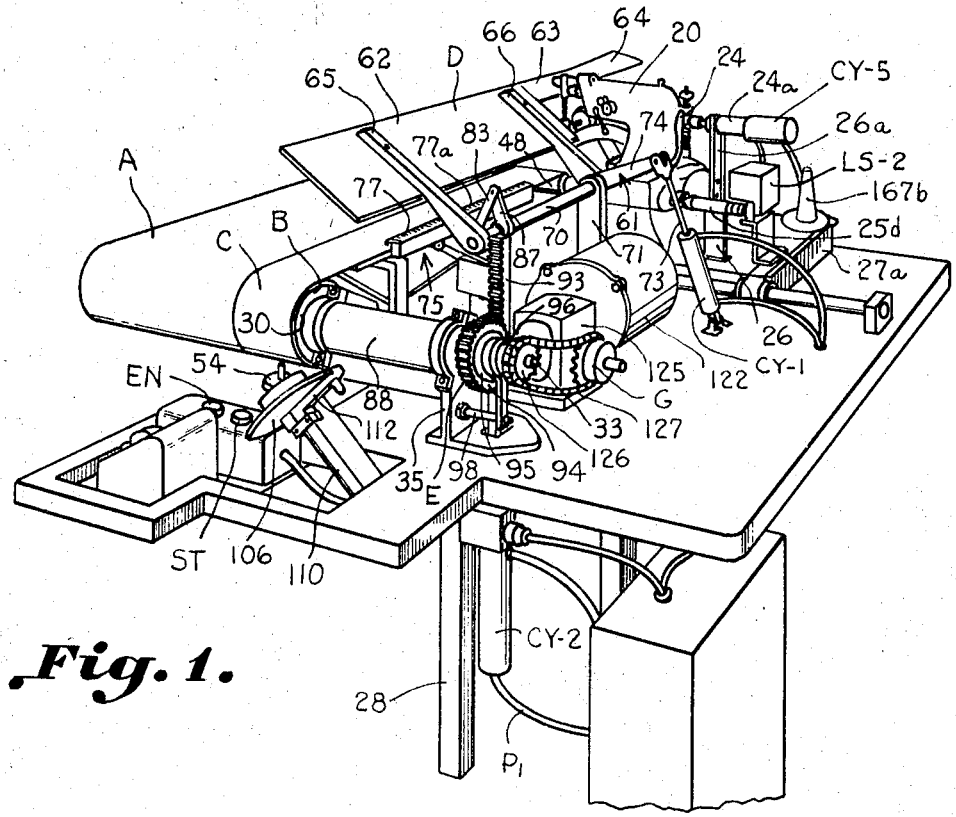

This invention relates to a garment handling device including a sewing machine capable of automatically performing sewing operations at discrete spaced points on a garment, and more particularly to a garment handling device which advances the garment to successive operating points for performing stitching operations thereon.

Arrangements for automatically effecting a plurality of successive sewing operations at spaced aligned operating points on a garment have already become known, especially in sewing buttonholes and buttons on the garment. Many such arrangements are accompanied with awkward clamping mechanisms which cooperate with shiftable carriages. Frequently, such clamping devices interfere with the manipulation and sewing operation performed on the garment due to the fact that they are fixed to the shiftable carriage and moved with the carriage as such is shifted for successive sewing operations. Such conventional clamping mechanisms are especially awkward when it is designed to perform a sewing operation close to the bottom of the garment, such as in the hem, as well as adjacent the top of the garment. Frequently, the clamping mechanism has to be spaced a considerable distance from the sewing machine so that such will not strike the sewing machine needle when the garment is shifted. Therefore, the ends of the garment ride freely on the shiftable work carriage, and sometimes are not properly positioned under the needle and the presser foot of the sewing machine when the sewing operation takes place.

Another problem with sewing machines which are capable of automatically performing a plurality of successive sewing operations on a garment is setting the spacing between the desired stitching operations. One such device being heretofore used contemplates providing a carriage with a plurality of abutments or stops which may be locked on the carriage at selected spaced positions along the carriage. As the carriage shifts between successive positions, the abutments are in turn advanced sequentially to a position beneath the presser foot, at which position each abutment engages an actuator means which energizes the sewing machine. Thus, spacing of the stitching operations on the garment is determined by the spacing of the adjustable abutments on the carriage.

Another problem encountered in machines capable of performing a plurality of successive sewing operations on the garment is that after the garment has been shifted from one position to another sometimes the garment is not properly positioned under the presser foot of the sewing machine, and as a result, the stiching is improperly placed on the garment. In such a stitching operation is the making of a buttonhole, such destroys the entire garment. Therefore, it is extremely important that the garment be properly positioned under the presser foot of the sewing machine before the sewing operation is initiated. It is also important that the garment be properly positioned on the shiftable garment carrying member so that the stitching operations can be properly located on the garment. For example, in sewing buttonholes on a blouse it may be desired that the first buttonhole be placed adjacent the top of the blouse and the last buttonhole be placed in the hem of the blouse adjacent the bottom of the blouse. Thus, it can be seen that when the machine is adapted to automatically sew the buttonholes at spaced intervals, it is extremely important that the garment be properly located on the carriage.

Accordingly, it is an object of the present invention to provide a machine capable of performing a plurality of successive stitching operations on a garment while minimizing the above mentioned problem.

It is another important object of the present invention to provide a machine which incorporates a simple means for automatically selecting a desired number of sewing operations to be placed on a garment, as well as the desired spacing between successive sewing operations on the garment.

Still another important object of the present invention is to provide a shiftable garment carrying member with a novel drive means for the step by step advance of the garment carrying member through a plurality of spaced aligned operating points or stations.

A further important object of the present invention is to provide a control means wherein the desired spacing between successive sewing operations to be performed on a garment can be selected by merely shifting a cam having a plurality of stops thereon.

Another important object of the present invention is to provide a clamping member which cooperates with a shiftable garment carrying member which permits the shiftable garment carrying member to be shifted while the clamping member remains stationary relative to said sewing machine.

Still another important object of the present invention is to provide a novel guide means for aiding and properly locating a garment on a shiftable garment carrying member so that a plurality of successive sewing operations can be performed thereon.

Still another important object of the present invention is to provide a sewing machine with a garment detection means which prevents the sewing machine from automatically performing a stitching operation when a garment is not properly located under the presser foot of the sewing machine.

Another important object of the present invention is to provide a sewing machine with a thread engaging means which removes a thread used in a sewing operation from a garment after the sewing operation has taken place on said garment.

The apparatus designed to carry out the invention will be hereinafter described, together with other features thereof.

Figure 2:
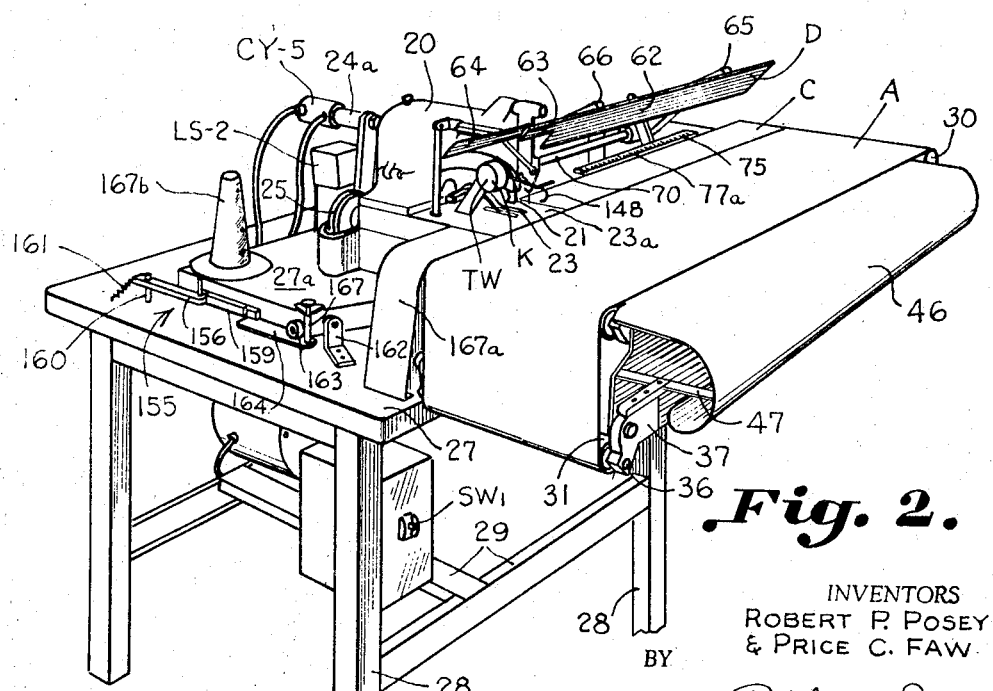
Figure 12:
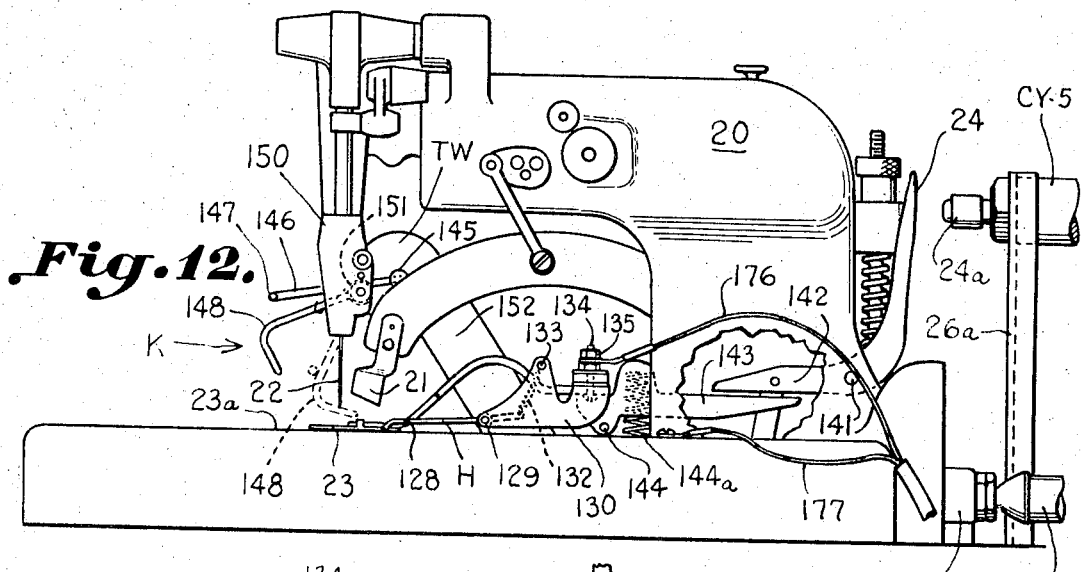
Figure 13:
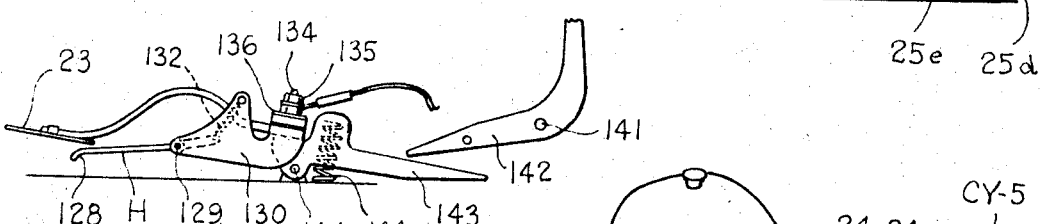
Figure 14:
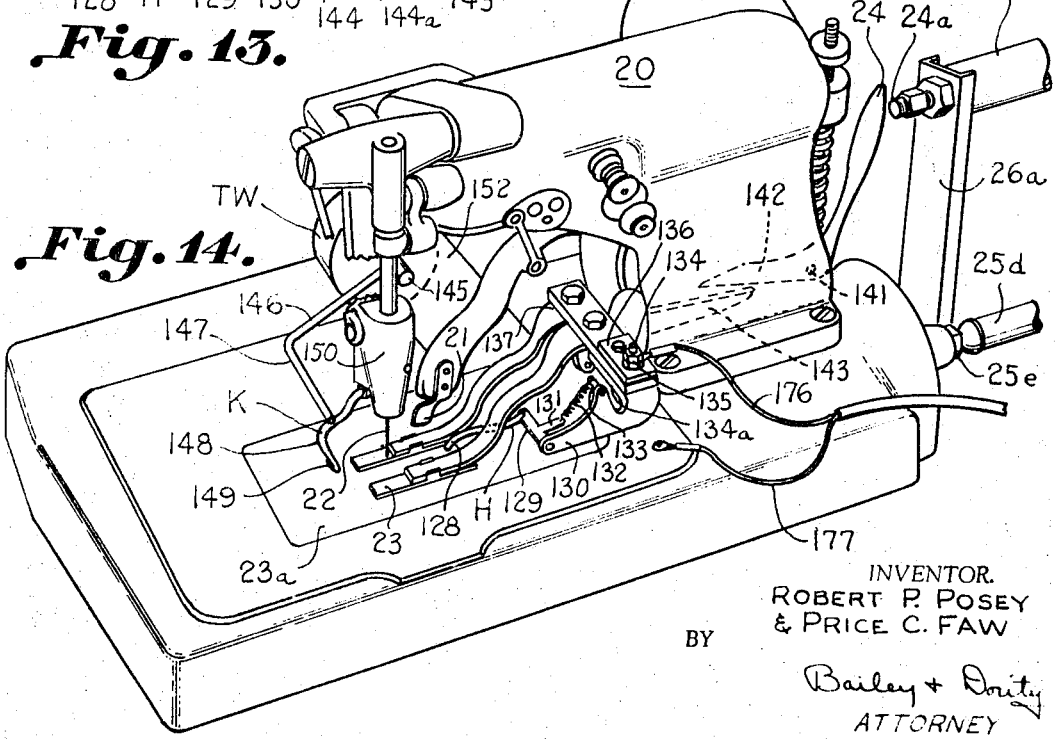
Figure 15:
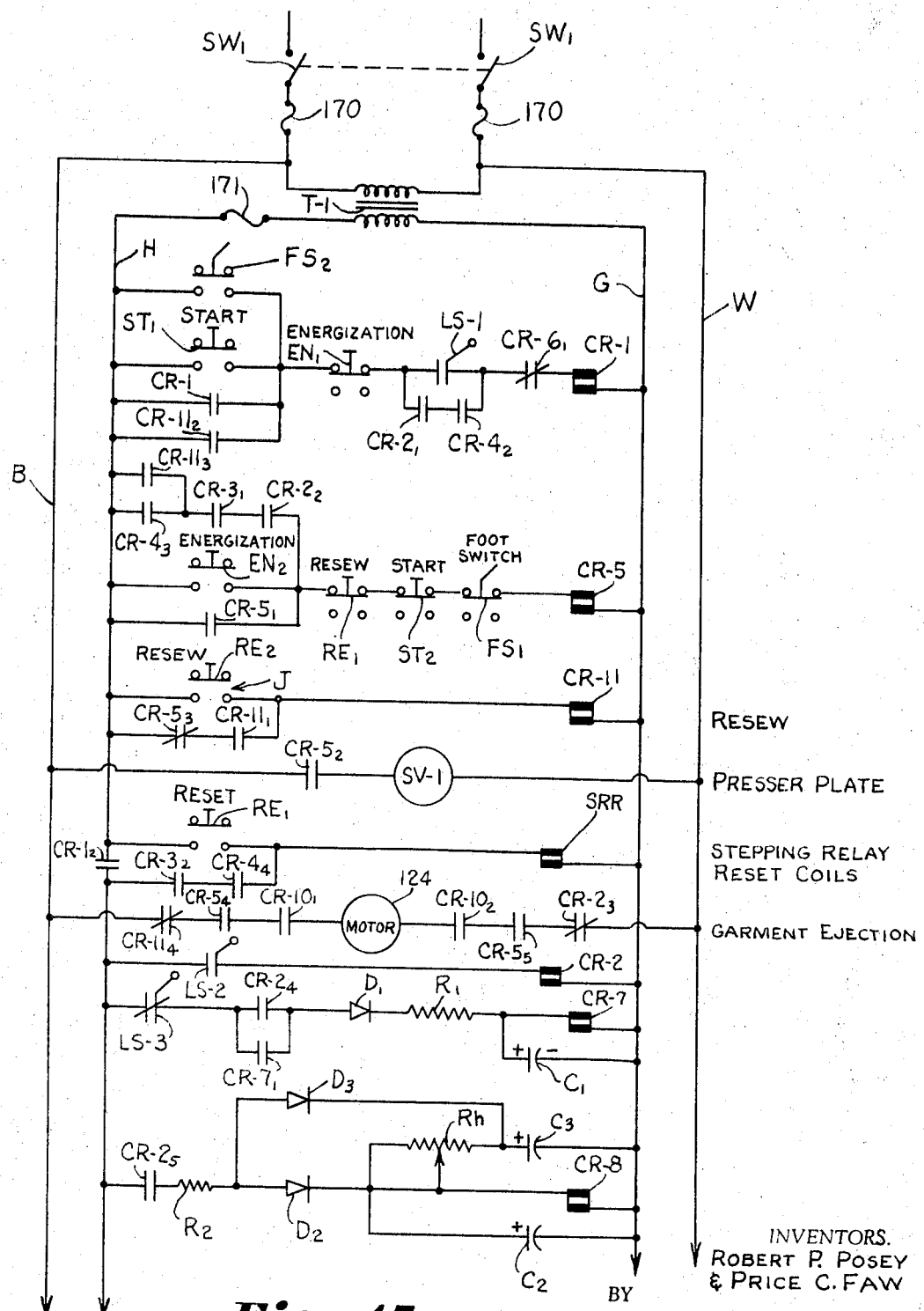
Figure 16:
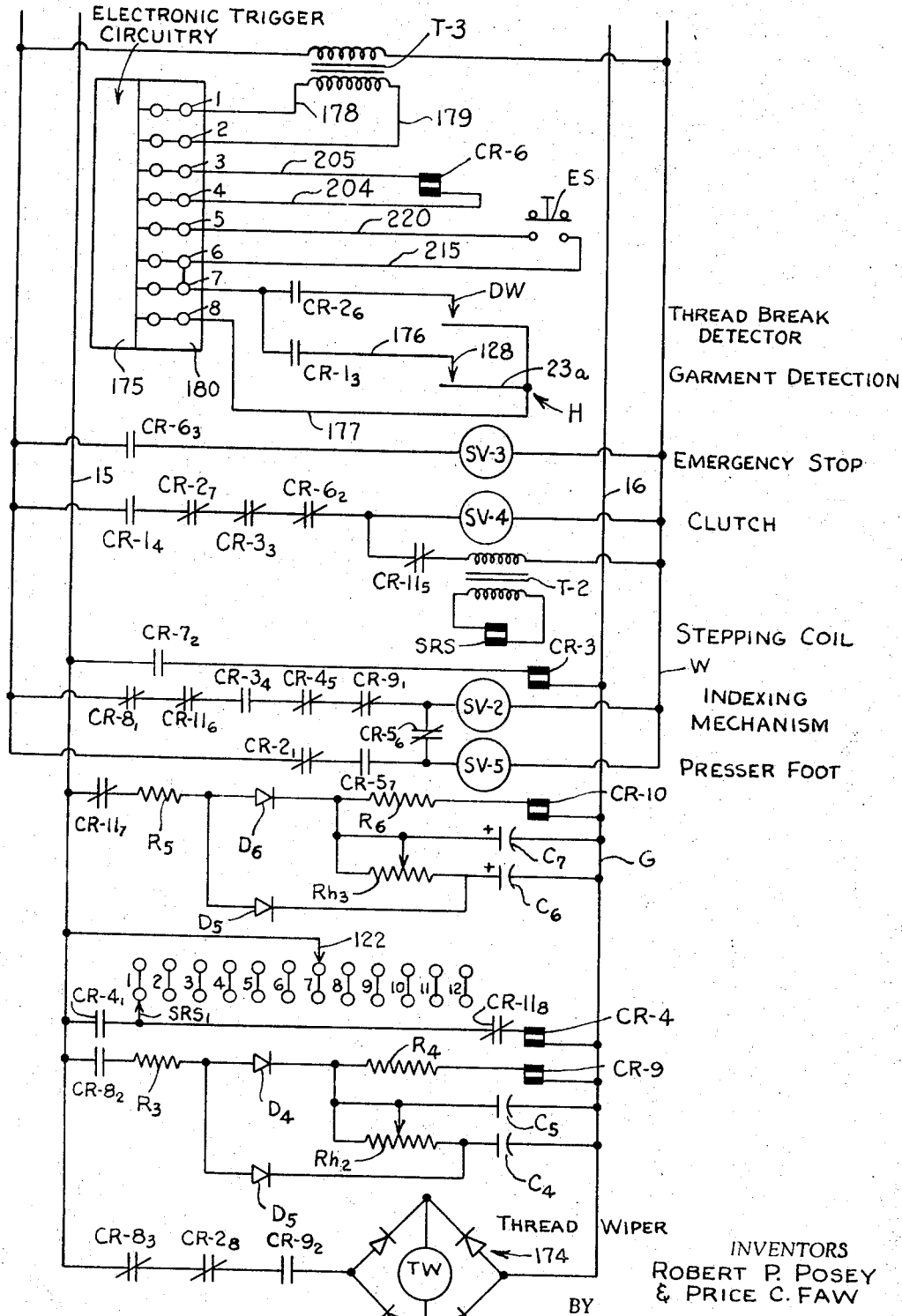

The invention will be more readily understood from a reading of the following specification and by reference to the accompanying drawings forming a part thereof, wherein an example of the invention is shown and wherein:

FIGURE 1 represents a rear perspective view of an automatically operable sewing unit constructed in accordance with the present invention, FIGURE 2 represents a front perspective view of the automatically operable sewing unit illustrated in FIGURE 1, FIGURE 3 is a top plan view of the sewing unit illustrated in FIGURE 1, FIGURE 4 is a plan view illustrating a rotatable disc used in setting the desired spacing between successive sewing operations on a garment, FIGURE 5 represents a side elevational view taken along line 5—5 of FIGURE 3, illustrating the drive mechanism for a garment carrying member constructed in accordance with the present invention, FIGURE 6 is a transverse sectional view taken along line 6—6 of FIGURE 5, illustrating a rack and cam having stops thereon for controlling the spacing between successive sewing operations on a garment, FIGURE 7 is an enlarged side elevational view partially in section, illustrating a clamping mechanism which is utilized in the sewing unit in a closed position and a garment guide means pivoted away from the garment carrying member, FIGURE 8 is an enlarged side elevational view illustrating the clamping mechanism in an open position and the guide means pivoted adjacent the garment carrying member, FIGURE 9 is a fragmentary side elevational view illustrating a belt tightening mechanism for the main conveyor belt, FIGURE 10 is a side elevational view illustrating a belt tightening mechanism for the secondary conveyor belt, FIGURE 11 is an enlarged top plane view of a sewing machine utilized in connection with the invention illustrating such mounted on a movable frame, FIGURE 12 is a side elevational view, partially in section, of a sewing machine provided with a garment detecting device and a thread removing device constructed in accordance with the present invention mounted thereon, FIGURE 13 is an enlarged side elevational view of the garment detecting device, FIGURE 14 is an enlarged perspective view of a sewing machine illustrating the pneumatic controls therefor and provided with a garment detection and a thread removing device constructed in accordance with the present invention, FIGURES 15 and 16 are a schematic diagram of the electrical controls for the sewing unit, FIGURE 17 is a schematic diagram of the electronic trigger circuit utilized in the control system for the sewing unit, and FIGURE 18 is a schematic diagram of the pneumatic system for the sewing unit.

The drawings illustrate a garment handling device for use with a sewing machine, such as a buttonhole sewing machine, capable of automatically performing successive sewing operations such as buttonholes including, mounting means for positioning the sewing machine in a fixed position. A first substantially horizontal endless conveyor belt A extends from a feeding position on one side of the sewing machine to the other side of the sewing machine for moving a flat garment in a linear path past the sewing machine for carrying out buttonhole sewing operations thereon. The first conveyor belt A is positioned forwardly of the buttonhole sewing machine. The sewing unit is provided with a mounting means B including a rotatably conveyor driving means which positions the first endless conveyor belt A in fixed position relative to the buttonhole sewing machine.

A second conveyor belt C is carried on the mounting means B in transverse alignment with the sewing machine extending adjacent but terminating short of the buttonhole sewing machine. A clamp D is positioned above the conveyor belts A and C and presses the garment against the conveyor belts. Means E is provided for intermittently rotating the driving means B for predetermined increments of conveyor movement in accordance with desired spacing between the buttonholes on the garment. Means F is coupled to the garment handling device for automatically controlling the number of buttonholes that are to be sewn on the garment. A garment ejection means G is provided for ejecting the garment from the conveyor belts A and C after the last buttonhole is sewn thereon. The sewing machine is provided with a garment detection means H (FIGURES 12, 13, 14, 15 and 16) which detects when a garment is under the presser foot. The garment detection means H is wired into the electrical circuitry of the sewing machine for preventing a buttonhole sewing operation from taking place when the garment is not properly positioned beneath the presser foot. A resew circuit J (FIGURE 15) is electrically connected in the electrical control circuit of the sewing machine. Means are provided for energizing the resew circuit J for repeating a buttonhole sewing operation prior to the conveyor belts shifting the garment to the location of the next buttonhole. A thread removing means K is carried on the sewing machine for removing the sewing thread from the garment after the buttonhole sewing operation has taken place so as not to impair the movement of the garment during the shifting operation.

In the embodiment of this invention illustrated in the drawings there is utilized a conventional buttonhole sewing machine 20 of the type adapted to automatically produce buttonholes on a garment. One such suitable buttonhole sewing machine is manufactured by the Reece Corporation of Waltham, Mass., and is referred to as the Reece S2 machine. Such a machine automatically sews a buttonhole on a garment and after the buttonhole has been sewn thereon a knife 21 automatically cuts the buttonhole and severs the upper and lower threads used in sewing such.

The sewing machine is provided with the usual reciprocating needle 22 and presser foot 23. The presser foot 23 is normally raised and lowered onto the frame 23a of the sewing machine 20 by manual movement of the lever arm 24. The sewing machine 20, modified in accordance with the present invention, has been provided with pneumatically operated cylinder CY–5 which automatically performs such a function. When air is supplied to the cylinder CY–5 a piston 24a associated therewith is extended causing the lever arm 24 to be pushed forward raising the presser foot 23. When air is permitted to exhaust from the cylinder CY–5, the piston 24a is retracted by a spring coupled thereto (not shown) permitting the presser foot 23 to be lowered. Power for reciprocally moving the needle up and down is received through a belt 25 which is in turn driven by a conventional sewing machine motor (not shown).

The sewing machine has a clutch mechanism (not shown) which is not normally engaged by the operator pulling a chain connected thereto. However, in order to enable the clutch to be automatically engaged a pneumatically operated clutch cylinder CY–4 (FIGURE 18) is provided and is positioned beneath the sewing machine. The piston 25a is connected to the conventional chain so that when the piston 25a of the clutch cylinder CY–4 is retracted such causes the clutch of the sewing machine 20 to be engaged to initiate the buttonhole sewing operation. The piston 25a is normally spring extended.

When the clutch of the sewing machine is engaged a laterally extending arm 25b is pivoted in a clockwise direction about a post 25c. The forward end of a plunger 25d is in engagement with an abutment 25e carried on the arm 25b and the clockwise movement of the arm 25b permits the plunger 25d to be moved forward. The rear end of the plunger 25d is in engagement with a pneumatic operated limit switch LS–2 and such clockwise movement of arm 25b permits the switch LS–2 to be closed after a brief time-delay. The switch LS–2 has a pneumatic operated spring associated therewith which is permitted to be gradually extended when the arm 25b is rotated in a clockwise direction. The closing of switch LS-2 initiates other operations which are discussed below. The plunger 25d and the presser foot cylinder CY-5 may be supported by any suitable means such as by the vertical brackets 26 and 26a, respectively.

A suitable mounting means, such as frame 27a, is utilized to position the sewing machine in a fixed position. The frame for supporting the sewing machine 20 is discussed more fully below in connection with FIGURE 11. The sewing machine 20 and the frame 27a are carried on a horzontal table 27 which is supported on vertical legs 28 having braces connected therebetween.

Referring now to FIGURES 1, 2 and 3, it is seen that a first substantially horizontal endless conveyor belt A extends from a feeding position on one side of the sewing machine to the other side of the sewing machine for moving a flat garment in a linear path past the sewing machine 20 for carrying out buttonhole sewing operations thereon. The first conveyor A is positioned forwardly of the buttonhole sewing machine 20 and is carried on a mounting means B including a rotatable conveyor driving means which positions the first endless conveyor belt A in a fixed position relative to the buttonhole sewing machine. The mounting means B for the first conveyor belt A includes a single drive roller 30 rotatably positioned adjacent one end of the table 27 and a pair of vertically spaced rollers 31 and 32 rotatably carried adjacent the other end of the table. The drive roller 30 is fixed to a laterally extending shaft 33 which is in turn journaled in a pair of vertical bearing posts 34 and 35, best illustrated in FIGURE 5.

The lower roller 31 of the pair of vertically spaced rollers, which support the other end of conveyor belt A is rotatably carried on a shaft 36 which is in turn supported between a pair of brackets 37, best illustrated in FIGURES 2 and 9. The brackets 37 are attached to a laterally extending portion 37a of the table 27 by any suitable means. The upper roller 32 is rotatably carried on a shaft 38 which is in turn supported between a pair of vertically extending arms 39 (see FIGURE 9). The lower end of the vertically extending arms 39 is pivotally connected to bracket 37 as by a pin 40, and has an outwardly extending flange 41 integral with its lower extremity. The flange has a horizontal portion 41 with a threaded aperture therein through which an adjusting screw 42 extends. The lower portion of the adjusting screw rides on a horizontal portion 43 of the bracket 37 so that by rotating the adjusting screw such causes the vertically extending arm 39 to be pivoted so as to vary the tension applied to the endless belt A through the upper roller 32. The adjusting screw 42 has a knurled locking nut 44 thread thereon which when tightened down upon the flange 41 locks the adjusting screw in position. The adjusting screw 42 has a knurled head 45 adjacent its top.

In order to prevent a garment upon which buttonholes are being sewn from becoming entangled between the endless belt A and the rollers upon which it is carried thereon an arcuately shaped protective shield 46 extends laterally beyond the belt A. The shield is attached to the main table 27 by any suitable means, such as braces 47.

A second and smaller conveyor belt C is carried by the drive roller 30 and a smaller roller 48 located adjacent the near side of the sewing machine 20. The second conveyor belt C is in transverse alignment with the sewing machine and extends adjacent, but terminates short of the buttonhole sewing machine. The garment upon which successive button holes are to be sewn is carried on the two belts A and C with the edge of the garment upon which the buttonholes are to be sewn being carried on the innerbelt C which terminates adjacent the sewing machine 20. The innerbelt C insures uniformly feeding of the inneredge of the garment to the sewing machine.

A separate belt tensioning means is provided for the innerbelt C, and such is illustrated in FIGURE 10. Such includes an elongated member 49 which is pivotally attached to a shaft 50 which has its free-end connected to the vertical bearing post 34. A tensioning roll 51 is rotatably carried on one end of the elongated member in engagement with the lower side of the belt C. A vertical sleeve 52 is integral with the other end of the elongated member and encompasses a tensioning screw 53 having a nut 54 threaded above the sleeve. The lower end of the tensioning screw is attached to a horizontally extending member 55 by a pin connection 56. The horizontally extending member is fixed to the main table 27 by bolts 57. Thus, it can be seen that by raising and lowering the nut 54 carried on the tensioning screw as by turning it, the pressure exerted on the underside of the conveyor belt C by the tensioning roll 51 may be varied so as to control the tension in the belt.

A horizontal elongated plate 58, best shown in FIGURE 7, is positioned under the top portion of the conveyor belt C and extends outwardly partially under the top portion of conveyor belt A so as to provide support for the belts and the garment carried thereon. The upper surface of the elongated flat plate is smooth so that the conveyor belt can move freely thereover. The elongated flat plate 58 is supported by suitable means, such as depending braces 59, which are supported on the table 27.

A clamp D (see FIGURES 1, 2, 3, 7 and 8) is positioned above the conveyor belts A and C and presses a garment (not shown) against the conveyor belts. The clamp D is provided with means, generally designated at 61, for raising and lowering the clamp so that the garment can be inserted on the conveyor belts A and C. The clamp is fixed against longitudinal movement so that such remains stationary as the conveyor belts A and C and the garment are driven in predetermined increments of movement in accordance with the desired spacing between sewing operations. The clamp D includes an enlongated horizontal presser plate 62 which extends laterally over the entire upper surface of belt C and partially over the upper surface of belt A. The main body portion of the elongated plate 62 terminates short of the sewing machine 20, but has an enlongated horizontal arm 63 integral with the end thereof which extends beyond the needles of the sewing machine and laterally displaced therefrom. A flexible horizontal plate 64 is attached to the free-end of the elongated arm 63 for holding the garment adjacent the conveyor belt A after the garment passes the sewing machine.

It is noted that the main body of the clamping means maintains the garment in contact with the two conveyor belts A and C until the garment reaches the sewing machine 20, and the elongated arm 63, and the flexible plate 64 maintains the garment in engagement with the belt A for a short distance after the garment passes the sewing machine. Such aids in positioning the garment under the presser foot 23 of the sewing machine while the successive sewing operations are taking place thereon.

The supporting structure for the clamp D is illustrated in FIGURES 1, 2, 3 and especially FIGURES 7 and 8. The presser plate 62 has a flexible connection with a pair of longitudinally spaced arms 65 and 66. The plate is connected to the longitudinally spaced arms 65 and 66 by means of studs 67 which have a head recessed in the bottom surface of the plate 62. The studs 67 extend through the plate and apertures in the transverse arm 65 and 66 and are secured thereto by a pair of nuts 68 threaded on their other end. A washer 69 is positioned on the studs 67 between the plate 62 and the transverse arms 65 and 66 so as to permit the plate 62 to move slightly relative to the transverse arms for leveling the plate on the garment carried on the belts. The other end of the transverse arms 65 and 66 have a fixed connection with a rotatable longitudinal shaft 70, which is in turn journaled in a pair of longitudinally spaced bearing posts 71.

The presser plate 62 is raised and lowered by a pneumatic cylinder CY-1 which has one end pivotally connected to the table 27 and a piston 73 extends out of the other end. The free-end of the piston 73 is pivotally connected to an arm 74 which has its free-end fixed to the longitudinal shaft 70. When the piston 73 of the pneumatic cylinder CY-1 is extended such causes the arm 74 to rotate the longitudinal shaft 70 in a counterclockwise direction, which in turn causes the presser plate 62 to be lowered. Upon retracting the piston 73 the presser plate 62 is raised.

A guide means, generally designated at 75, is also operably connected to the longitudinal shaft 70 so that as the presser plate is raised the guide means 75 is positioned on the inner edge of the conveyor belt C for properly locating the garment on the conveyor belt. The guide means includes a vertical flange 76 which terminates in a horizontal flange 77. The horizontal flange 77 has a graduated scale thereon which aids the operator in positioning the garment on the conveyor belt so that the last buttonhole which is to be sewn onto the garment can be properly located on the garment. Frequently, with such garments as blouses, it is desirable that the last buttonhole, which is to be positioned adjacent the bottom of the garment, be located at a precise point on the garment, such as in the hem. From previous calculations an operator can determine exactly where the first buttonhole should be sewn on the garment so that the last buttonhole can be sewn in the desired position. When such has been determined the operator merely has to refer to a guide member 77a carried on the guide 77 so as to properly locate the garment thereon.

The edge of the garment is placed flush against the vertical flange 76 of the guide means 75 so as to aid the operator in properly aligning the garment laterally with respect to the needle 22 of the sewing machine 20. Such insures proper spacing of the buttonholes on the garment relative to the edge of the garment.

The horizontal flange 77 of the guide means 75 is attached by a screw 78 to a post 79 which has its free-end fixed to a pivotal member 80. One end of the pivotal member 80 is pivotally attached to a bracket 81, which is in turn attached by a fixed connection to the underside of the elongated flat plate 58. The other end of the pivotal member 80 is pivotally connected to a linking arm 82 and the free-end of the linking arm 82 is resiliently and slightly pivotally connected to an intermediate linking arm 83 through a spring 84 and a pin 84a. The spring 84 has one end recessed in a laterally extending portion 85 of the arm 82 and has its other end recessed in a laterally extending portion 86 of the intermediate linking arm 83. Such a linkage prevents the vertical flange 76 of the guide means 75 from cutting into the belt C when the guide is lowered onto the belt as would possibly be the case if there were a fixed connection between the linking arm 82 and the intermediate linking arm 83. The free-end of the intermediate linking arm 83 is pivotally connected to an upwardly extending arm 87 which has its free-end fixed by any suitable means to the rotatable longitudinal shaft 70.

Thus, it can be seen that the movement of the guide means 75 is synchronized with the movement of the presser plate 62 in that when the presser plate is lowered to the position illustrated in FIGURE 7 the guide means 75 will be pivoted rearwardly and downwardly so as not to interfere with the presser plate 62 being positioned on the garment. When the presser plate 62 is raised, the guide means 75 is raised since it is driven off the same shaft 70, and is positioned on the conveyor belt C as illustrated in FIGURE 8.

Before the sewing unit is energized the presser plate 62 is in a lowered position in contact with conveyor belts A and C. The presser foot 23 of the sewing machine is also in a lowered position. When the operator presses an energization button EN such causes solenoid valve SV-1 to be energized permitting air to be supplied to the cylinder CY-1, which in turn retracts its associated piston 73 causing the presser plate 62 to be raised. Simultaneously, the solenoid valve SV-5 is energized permitting air to flow into the foot cylinder CY-5 causing the piston 24a associated therewith to be extended for moving the lever arm 24 forwardly to raise the presser foot 23. At this time the sewing unit is ready to receive the garment upon which the buttonholes are to be sewn. The garment is placed on the conveyor belts A and C underneath the presser plate 62 with the desired location of the first buttonhole being placed directly under the needle 22 of the sewing machine. The edge of the garment is placed adjacent the guide means 75 so as to align the garment with the needles of the sewing machine. A start button ST or a foot switch FS is then depressed which causes the presser plate 62 and the foot 23 of the sewing machine to be in turn lowered upon the garment 60. When the presser plate 62 is lowered such movement causes the limit switch LS-1 to be closed which in turn causes the solenoid valve SV-4 to be energized permitting the piston 25a of the clutch cylinder CY-4 to be retracted. The retraction of the piston 25a causes the clutch mechanism of the sewing machine to be engaged. When the clutch is engaged the sewing machine begins sewing the first buttonhole on the garment.

The closing of the clutch of the sewing machine permits the limit switch LS-2 to be closed after a brief time-delay. Such in turn causes the solenoid valve SV-4 to be de-energized permitting air to exhaust from the clutch cylinder CY-4, which in turn allows piston 25a to be extended by a spring associated therewith.

It is noted that once the buttonhole sewing operation begins the sewing machine continues sewing the buttonhole even if the piston 25a associated with the clutch cylinder CY-4 is permitted to rise. Such is due to mechanism inherent in the sewing machine.

Upon completion of the first buttonhole, the sewing machine clutch mechanism is disengaged opening the limit switch LS-2. Such in turn causes the thread removing means K carried on the sewing machine to be energized for removing the thread from the garment. The closing of the limit switch LS-2 also, energizes the solenoid valves SV-2 and SV-5 causing the foot of the sewing machine to be raised and also causing the indexing mechanism to shift the conveyor belt one increment so that the garment is shifted to the location where the next buttonhole is to be shown.

Atfer sewing of the first buttonhole means E intermittently rotates the driving means B, which includes the drive roller 30 upon which the conveyor belts A and C are carried for a predetermined increment of movement in accordance with the desired spacing between the buttonholes on the garment. The shaft 33 upon which the drive roller 30 is carried extends laterally beyond the drive roller. An elongated cylinder 88 is carried on the shaft 33 by means of a pair of spaced bearings (not shown) permitting the shaft 33 to rotate freely within the cylinder 88. The cylinder in turn has a fixed connection with the vertical posts 34 and 35 so as to provide support for the rotating shaft 33.

In order to prevent the drive roller 30 from overdriving as it is intermittently rotated a predetermined amount, such is provided with a braking mechanism, generally illustrated at 89. The braking mechanism 89 includes a shoe 90 which is in frictional engagement with the drive roller 30. The shoe is carried on a laterally extending arm 91 which is in turn pivotally connected to a lateral bar 92 carried by the bearing posts 34 and 35. The free-end of a laterally extending arm 91 has an adjustable spring biased member 91a carried therein which engages the lateral bar 92 to control the frictional contact between the shoe 90 and the drive roller 30.

Intermittent rotation of the shaft 33 and the drive roller 30 for providing predetermined increments of movement of the conveyor belts A and C corresponding to the desired spacing between the buttonholes on the garment is accomplished through a rack 93 which is meshed with a gear 94. The gear 94 is pressed on a drive clutch 95 which is in turn coupled to the drive shaft 33. When the rack 93 is pulled down vertically a predetermined distance such imparts a clockwise rotation to the shaft 33 which causes the conveyor belts A and C to be rotated a corresponding distance. One suitable clutch is a formsprag overriding clutch having a Model No. FSO5 and is manufactured by the Formsprag Company of Warren, Mich.

Pressure is exerted on the rear surface of the rack 93 by a roller 93a for maintaining the teeth on the rack in engagement with the gear 94. The roller 93a is supported by a vertical arm 93b which has its free-end pivotally attached to a post 93c carried on the table 27. An adjustable spring biased plunger 93d is supported by a brace 93e which is in turn connected to the post 35 for exerting pressure on the vertical arm 93b. Such causes a predetermined amount of pressure to be applied to the rack 93 through the roller 93a.

The clutch 95 drives the shaft 33 in a clockwise direction. However, when the rack is raised to its initial position the clutch will not drive the shaft in the counterclockwise direction. An anti-backup clutch 96 is carried on the shaft 33 adjacent the drive clutch 95 so as to insure against counterclockwise rotation of the shaft 33 when the rack is raised to its initial position. The anti-backup clutch 96 permits the shaft to rotate freely in the clockwise direction but prevents rotation of the shaft in a counterclockwise direction. The anti-backup clutch has its outer shell fixed to a vertical bracket 97, which is in turn connected to the bearing post 35 through a laterally extending post 98.

The vertical movement of the rack 93 is accomplished by means of a pneumatically operated cylinder CY-2, herein after referred to as the indexing cylinder. The indexing cylinder CY-2 is supported on the underside of the table 27 by means of a U-shaped bracket 100. A piston 101 extends vertically from the indexing cylinder CY-2 and has a vertical post 102 threaded on its free-end. The lower end of the rack 93 is integral with the top of the post 102 for relative movement therewith. It is noted that the table 27 has an aperture 103 therein for permitting the vertical post to extend therethrough. A laterally extending abutment 104 is integral with the upper end of the vertical post 102. When the indexing cylinder CY-2 retracts the piston 101, such causes the abutment 104 to strike a stop 104a carried on an accentric cam 105 for controlling the vertical movement of the rack and in turn the rotation of the conveyor belts A and C. a back-up roller 105a is carried by the bracket 100 for engaging the back of the post 102 when such is lowered so as to insure that the abutment 104 does not slip off the stop 104a when such is lowered.

The accentric cam 105 has a plurality of stops 104a on its perimeter, as best illustrated in FIGURE 5, so that by rotating a disc and in turn the cam, the operator can select a desired spacing between buttonholes by controlling the vertical movement of the rack 93.

In order for the operator to select the desired spacing between successive buttonholes to be sewn on a garment the disc 106 is rotated by means of a knurled knob 107 so that a reference mark 108 is aligned with the indicia 108a carried on the disc 106 which represents the spacing between the buttonholes in inches. The disc 106 and the knob 107 are fixed to a shaft 109 which is rotatably carried within a cylinder 110. The reference mark 108 and a spring biased plunger 111, which engages indentures on the underside of the disc 106 carried opposite the indicia 108a for maintaining the disc stationary at selected points, are carried on a laterally extending arm 112. The laterally extending arm 112 has a collar 112a on its free-end which is fixed to the cylinder 110. When the shaft 109 is rotated such rotation is imparted to a horizontal shaft 113 through a pair of miter gears 114. The eccentric cam 105 is carried on the free-end of the horizontal shaft 113. A suitable L-shaped bracket 115 is utilized to maintain the cylinder 110 and the miter gears in operable connection with the horizontal shaft 113. It is noted that the horizontal shaft 113 is permitted to rotate within the L-shaped bracket 115. The other end of the horizontal shaft is support within the U-shaped bracket 100 on a spring biased plunger 116 so that as the abutment 104 which is carried on the vertical post 102 strikes a stop 104a on the cam 105, the horizontal shaft 113 is depressed slightly. A microswitch LS-3 is positioned directly below the horizontal shaft 113 so that when the horizontal shaft is depressed such causes the microswitch, hereinafter referred to as limit switch LS-3, to close. The closing of the limit switch LS-3 causes the indexing mechanism, which includes the indexing cylinder CY-2, to be reset and such also causes a solenoid valve SV-5 to be de-energized to lower the sewing machine foot 23. The resetting of the indexing mechanism is accomplished by permitting air to flow in a lower part $P_1$ of the indexing air cylinder CY-2 causing the piston 101 associated therewith to be extended to its initial position.

The solenoid valve SV-4 is then energized causing air to be supplied to the input port of the clutch cylinder CY-4 which in turn retracts the spring extended piston 25a associated therewith, for causing the sewing machine clutch to be engaged for beginning the sewing of the second buttonhole.

Means F is coupled to the garment handling device for automatically controlling the number of buttonholes that are to be sewn on the garment. The operator can select the desired number of buttonholes to be sewn on the garment by rotating the knob 120 a numeral carried on a switch 121, which corresponds to the desired number of buttonholes. The rotation of the knob 120 causes a selector contact 122 (FIGURE 16) to be connected to one side of a stepping relay contact which corresponds to the desired number of buttonholes to be sewn on the garment. The operation of the stepping relay is discussed more fully below in connection with the electrical circuitry. The switch 121 is supported on a laterally extending portion 123 of the table 27.

A garment ejection means G is provided for ejecting the garment from the conveyor belts A and C after the last buttonhole is sewn thereon. As the last buttonhole is sewn a signal is supplied to an electric motor 122 carried on the table 27 for energizing such. The rotation of the electric motor is reduced by a reduction gear 125, which in turn drives a sprag clutch 126 carried on the drive shaft 33 through a chain 127. The clutch 126 is pressed in a cylindrical gear which meshes with the chain 127. The clutch 126 is provided to drive the shaft 33 in a clockwise direction and thus, rotates the conveyor belts A and C until the garment has been ejected from the end of belt A. Both the anti-backup clutch 96 and the ejection clutch 126 are manufactured by the Formsprag Company and have a Model No. FS05.

It is noted that the ejection clutch 126 will drive the shaft 33 in a clockwise direction as it is rotated. However, due to the peculiar features of the clutch, such does not interfere with the operation of the drive clutch 95 and the anti-backup clutch 96.

The sewing machine is provided with a garment detection means, generally designated at H, which detects when a garment is under the presser foot 23. The garment detection means is wired into the sewing machine circuitry for preventing a buttonhole sewing operation from taking place when the garment is not properly positioned beneath the presser foot 23.

The garment detection means H includes a feeler wire 128 which is positioned between the bifurcated end of the presser foot 23 so that such strikes the frame 23a of the sewing machine before the presser foot 23 when the presser foot is lowered. The feeler wire 128 is carried on one end of a longitudinally extending rod 129, which has its free-end pivotally connected to a side bracket 130. The rod 129 has a laterally extending element 131 fixed thereto, which in turn has its free-end attached to one end of a spring 132. The other end of the spring is attached to a longitudinally extending post 133, which is carried by an upwardly extending portion of the side bracket 130. The spring causes the rod 129 to pivot clockwise for maintaining the feeler wire 128 slightly below the presser foot so that the feeler wire will strike the frame 23a of the sewing machine prior to the presser foot 23. The side bracket 130 has a longitudinally extending flange 134a which is secured to the presser foot assembly by a bolt 134 and nut 135. A layer of insulation (not shown) is placed between the longitudinally extending flange 134a and the presser foot assembly 137 to insulate the side bracket from the presser foot assembly. The bolt 134 also has an insulated sleeve surrounding such (not shown) so that the bolt 134 does not make electrical connection with the presser foot assembly. Another layer of insulation 136 is carried above the presser foot assembly for insulating the nuts 135 from the presser foot assembly.

One side of the garment detection circuitry illustrated in the electrical diagram of FIGURES 15 and 16 is connected by the lead 176 to the bolt 134 which is in turn electrically connected to the feeler wire 128 through the side bracket 130. The other side of the garment detection circuit is connected to the frame 23a of the sewing machine by lead 177. Thus, it can be seen that if no garment is positioned beneath the presser foot when such is lowered the feeler wire 128 will strike the frame of the sewing machine and close the garment detection circuit. Whereas, if the garment is positioned beneath the presser foot when such is lowered, the garment will insulate the feeler wire 128 from the electrically conductive frame 23a of the sewing machine thus, preventing the garment detection circuit from being closed and enabling the buttonhole sewing operation to take place.

As previously mentioned, the presser foot 23 and the feeler wire 128 are raised and lowered by manipulation of the lever arm 24. When the lever arm 24 is moved forwardly such pivots about a pin 141 causing the laterally extending arm 142 to be moved downwardly for forcing a laterally extending arm 143 carried by the presser foot assembly to also be forced downwardly. The laterally extending arm 143 and the presser foot are pivotally carried by a pin 144 so that as the arm 143 is pressed downwardly the presser foot is raised up from the frame 23a of the sewing machine. When the forward pressure is removed from the lever 24 a spring 144a carried by the laterally extending arm 143 forces the arm upwardly causing the lever 24 to return to its initial position, also, causing the presser foot to be lowered onto the frame 23a of the sewing machine. Such raising and lowering of the presser foot is a conventional method inherent in the Reece Buttonhole Sewing Machine.

A thread removing means, generally designated at K, is carried on the sewing machine for removing the sewing thread from the garment after the buttonhole sewing operation has taken place so as not to impair the movement of the garment during the indexing operation. The thread removing means K includes a rotating solenoid, hereinafter, referred to as the thread-wiper solenoid TW which has a shaft 145 extending longitudinally therefrom, and is rotated forty-five degrees in a clockwise direction when the solenoid is energized. A laterally extending arm 146 is integral with the shaft 145 and terminates in a longitudinal bar 147. An arcuately shaped thread engaging member 148 having a barb 149 on its free-end is rotatably carried by the head assembly 150 of the sewing machine 20 by any suitable means. When the thread-wiper solenoid TW is energized, such rotates the laterally extending arm 146 causing the longitudinal bar 147 to engage the arcuately shaped thread engaging member 148 for pivoting such to the position illustrated in dotted lines in FIGURE 12 so that the barb 149 carried thereon can engage the thread that was used in sewing the buttonhole for removing such from the garment as the thread engaging member 148 returns to its initial position. A spring 151 is carried by the head assembly 150 and has one end thereof positioned under the arcuately shaped thread engaging member 148 and the other end thereof fixed to the head assembly 150 so that when the longitudinal bar 147 is raised to its initial position the spring 151 will raise the thread engaging member to its original position.

It is noted that prior to the arcuate shaped thread engaging member 148 engaging the thread, the thread was cut by the knife 21 carried by the sewing machine 20. The thread-wiper solenoid TW is supported by an upwardly extending brace 152 which has its free-end fixed by any suitable means to the frame of the sewing machine.

The sewing machine is carried on a movable frame 27a (FIGURES 2, 3 and 11) so that the sewing machine can be moved rearwardly to the position illustrated in FIGURE 11 for servicing. The frame 27a is carried on a laterally extending shaft 153 by means of a pair of sleeves 154 so that such can be moved forwardly and rearwardly on said shaft. The shaft 153 is fixed to the table 27 of the sewing unit. A latching device, generally designated at 155, is positioned on the other side of the frame 27a for locking the frame in the forward and rearward positions. The latching device includes a laterally extending pivotal member 156 which has a protrusion 157 adjacent one end for engaging indentures 158 located in a side plate 159 carried on the frame 27a. The laterally extending member 156 is pivotally connected to the table 27 by a pivot joint 160 and the other end of the laterally extending member 156 is connected by a spring 161 to the table 27 for maintaining the protrusion 157 in engagement with the indentures 158 carried on the side bracket 159.

After the servicing of the machine the movable frame 27a is moved forwardly until such strikes the stop 162. It is noted that the side of the frame 27a upon which the latching mechanism 155 is located is supported on a roller 163 which rides on a flat plate 164. A longitudinally extending bracket 165 having an opening 166, which encompasses a post 167 when the sewing machine is in the forward position aids in stabilizing the frame 27a.

A supporting member 167a is carried on the frame 27 for supporting the garment for a short distance after such passes the sewing machine 20. The upper surface of the supporting member is level with the frame 23a of the sewing machine and the belts A and C. The supporting member 167a has a hinge connection with the table 27 so that such can be pivoted outwardly when the sewing machine is being serviced.

*Electrical control circuit*

A schematic diagram illustrating the electrical circuitry for the machine is shown in FIGURES 15, 16 and 17 of the drawings. FIGURE 18 is a schematic diagram of the air control circuit for the machine. FIGURES 15 and 16 should be attached end to end when reading the specification on the drawings.

Referring to FIGURES 15, 16 and 18 of the drawings, the relay contacts and the solenoid valves are illustrated in the poistion which they will take when the main power switch $SW_1$ is open. When switch $SW_1$ is open the presser plate 62 is in the down position resting on the conveyor belts A and C. The first step in the operation is to close the power switch $SW_1$ which places voltage across the outside parallel leads B and W. The voltage is also connected through a pair of fuses 170 to the primary winding of a step-down transformer T–1 which steps the voltage down on its secondary winding. The secondary winding of transformer T–1 is connected between the parallel leads G and H through a fuse 171. The majority of the control circuitry for the machine is connected in a plurality of parallel circuits between the leads G and H or the leads B and W.

In order to initially start the machine so that it will be ready to receive the garment on which the sewing operation, such as making buttonholes, is to take place the energization button EN is depressed. It is noted that the energization button operates a pair of contacts $EN_1$ and $EN_2$. Such causes current to flow from lead H through the contacts made by the energization contact $EN_2$, resew contact $RE_1$, start contact $ST_2$, and foot switch $FS_1$ energizing control relay RS–5 and completing the circuit through lead G. Upon energization of the relay CR–5, the normally open contact $CR–5_1$ is closed locking the relay CR–5 into the circuit so that upon opening of the energization contact $EN_2$ the relay CR–5 will remain energized.

When the relay CR–5 is energized, the normally open contact $CR–5_2$ in the presser plate circuit is closed causing the solenoid valve SV–1 to be energized. The closing of solenoid valve SV–1 permits air to flow from an air supply through a standard filter 172, oiler 173 (FIGURE 18) and the solenoid valve SV–1 into the upper end of an air cylinder CY–1 hereinafter referred to as presser plate cylinder to raise the presser plate 62. The energization of relay CR–5 also causes normally closed contact $CR–5_3$ in the resew circuit to open. In the ejection garment circuit there are a pair of contacts $CR–5_4$ and $CR–5_5$ which are controlled by relay CR–5. These normally open contacts $CR–5_4$ and $CR–5_5$ are closed upon the energization of relay CR–5 partially closing the ejection garment circuit.

The energization of the relay CR–5 causes contact $CR–5_6$ interposed between the indexing mechanism circuit and the presser foot circuit to open and causes contact $CR–5_7$ in the presser foot circuit to close. The closing of contact $CR–5_7$ causes current to flow between the leads B and W to energize solenoid valve SV–5. When the solenoid valve SV–5 is closed air is permitted to flow through a flow control valve $FC_1$ into an air cylinder CY–5 hereinafter referred to as foot cylinder 20b causing a piston 24a carried by the cylinder CY–5 to be extended to raise the sewing machine foot 23.

The next step in the operation is to lay a garment upon which buttonholes are to be sewn onto the conveyor belts A and C underneath the presser plate 62 with the desired locations of the first buttonhole being placed directly under the needle 22 of the sewing machine 20. The start button ST for the sewing machine or the foot switch (not shown) is then depressed. It is noted that contacts $ST_1$ and $ST_2$ are operated by the start button and contacts $FS_1$ and $FS_2$ are operated by the foot switch and are located in the relay CR–1 circuit and relay CR–5 circuit.

When either the start contact $ST_2$ or the foot switch contacts $FS_1$ of the CR–5 circuit is depressed, such opens the CR–5 circuit causing relay CR–5 to be de-energized. The contact $CR–5_2$ of the presser plate circuit is opened when relay CR–5 is de-energized causing solenoid valve SV–1 to be de-energized. When solenoid valve SV–1 is de-energized air flows into the lower end of the air cylinder CY–1 associated therewith, causing the presser plate to be lowered. Relay contact $CR–5_7$ of the presser foot circuit is opened by de-energization of relay CR–5 causing solenoid valve SV–5 to be de-energized. The de-energization of the solenoid valve SV–5 stops the flow of air to the cylinder associated therewith, and a spring retracts the piston 24a carried by the cylinder CY–5 causing the sewing machine foot to be lowered onto the garment.

When the presser plate 62 was lowered, it closed the limit switch LS–1 of the relay circuit CR–1 causing relay CR–1 to be energized closing contact $CR–1_1$ thus, locking in the relay CR–1 between the leads H and G. Normally, open contact $CH–1_2$ which is interposed in lead H adjacent the stepping relay reset circuit, is closed permitting voltage to be supplied to circuitry therebelow. Normally, open contact $CR–1_3$ of the garment detection circuit is closed energizing same. The garment detection circuit is described more fully below. Normally, open contact $CR–1_4$ of the sewing machine clutch circuit is closed completing the circuit between the lead B and W causing the sewing machine solenoid valve SV–4 to be energized. The energization of solenoid valve SV–4 permits air to be supplied through a flow control valve $FC_2$ to an air cylinder CY–4 causing the cylinder to retract the piston 25a. The clutch mechanism for the sewing machine is connected to the piston of the air cylinder CY–4 and is engaged upon retraction of the piston. When the clutch is engaged the sewing machine begins sewing a buttonhole on the garment. Once the buttonhole sewing cycle begins the clutch is locked in by mechanism inherent in the sewing machine until the entire buttonhole is sewed thus, de-energization of solenoid valve SV–4 has no effect on the clutch until the buttonhole sewing cycle is completed.

At the same time that solenoid valve SV–4 is energized, current flows through the primary winding of transformer T–2 energizing the stepping relay stepping coil SRS which is connected in series with the secondary winding of the transformer T–2. Such causes the wiper $SRS_1$ of the stepping relay SRS to move from contact 1 to contact 2. The closing of the clutch of the sewing machine closes limit switch LS–2 of the CR–2 circuit after a brief time-delay obtained by a penumatic operated element. Such a penumatic time-delay switch is a conventional item and a suitable one can be purchased from the Square-D Electric Company having Catalogue No. 4373–S10–61. The closing of limit switch LS–2 causes the relay CR–2 to be energized.

When relay CR–2 is energized, it causes contact $CR–2_1$ in the CR–1 circuit to be closed partially completing a sealed in circuit around limit switch LS–1. Normally opened contact $CR–2_2$ of the relay circuit CR–5 closes partially completing the circuit around the energization contact $EN_2$. Normally closed contact $CR–2_3$ of the garment ejection circuit is opened preventing the closing of the garment ejection circuit. Normally open contact $CR–2_4$ of the relay CR–7 circuit is closed causing control relay CR–7 to be energized and charging the shunt capacitor $C_1$. Diode $D_1$ and current limiting resistor $R_1$ causes a D.C. current to flow in the relay circuit CR–7. The capacitor $C_1$ provides a time-delay circuit for relay CR–7 so that when one of the contacts in series with relay CR–7 is opened a short time-delay lapses before the relay is de-energized. The normally open contact $CR–2_5$ of the relay circuit CR–8 is closed causing relay CR–8 to be energized. The diodes $D_2$ and $D_3$ and current limiting resistor $R_2$ convert the A.C. voltage supplied to the relay circuit CR–8 by leads H and G, to a D.C. voltage. The relay CR–8 is provided with a time-delay circuit which prevents the relay CR–8 from being de-energized for a short period of time after the opening of contact $CR–2_5$. The time-delay circuit includes a pair of shunt capacitors $C_2$ and $C_3$. Capacitor $C_3$ is charged through both rheostat Rh and diode $D_3$. By charging capacitor $C_3$ through diode $D_3$ such charges at substantially the same rate as capacitor $C_2$.

Normally open contact $CR–2_6$ of the thread-break detector circuit is closed when relay CR–2 is energized. In the embodiment illustrated a thread-break detector is not utilized, however, when the machine is equipped with one such as a drop wire which is grounded when the thread breaks, it is only necessary to connect the drop wire, such as illustrated schematically at DW, into the circuit.

The normally closed contact $CR–2_7$ of the sewing machine clutch circuit is opened de-energizing solenoid valve SV–4 and the stepping relay stepping coil SRS. The de-energization of solenoid valve SV–4 causes the piston 25a of the air cylinder CY–4 associated therewith to be extended and removing tension on the chain associated with the clutch mechanism of the sewing machine 20. However, the sewing machine continues sewing the butonhole which it is sewing due to mechanism inherent in the sewing machine.

The normally closed contact $CR–2_8$ of the thread wiper circuit is opened preventing energization of the thread-wiper solenoid TW. It is noted that when the CR–2 relay was energized closing contact $CR–2_4$ of the relay CR–7 circuit the relay CR–7 was energized causing contact $CR–7_1$ to be closed sealing in the circuit for relay CR–7 between the leads H and G. At the present time the sewing machine is sewing the first buttonhole on the garment.

The energization of control relay CR–7 causes contact CR–7₂ of the relay circuit CR–3 to close energizing relay CR–3. As previously mentioned, control relay CR–8 was energized simultaneously with relay CR–7. The normally closed contact CR–8₁ of the indexing mechanism circuit is opened preventing energization of the solenoid valve SV–2 which controls the indexing operation. The normally open contact CR–8₂ in the relay circuit CR–9 is closed upon energization of relay CR–8 causing relay CR–9 to be energized by a D.C. voltage due to the diode D₄ and current limiting resistors R₃ and R₄ in series therewith. A time-delay circuit is electrically connected in shunt with the control relay CR–9 so that upon opening of contact CR–8₂ a short period of time lapses before relay CR–9 is de-energized. The time-delay circuit includes a pair of shunt capacitors C₄ and C₅. Capacitor C₄ is charged through rheostats Rh₂ and diode D₅ so that its charging time is substantially the same as capacitor C₅. The normally closed contact CR–8 of the thread-wiper circuit is opened preventing energization of the thread-wiper solenoid TW.

As previously mentioned, the control relay CR–3 is energized. The energization of relay CR–3 causes normally open contact CR–3₁, which is in the relay CR–5 circuit, to close partially completing the shunt circuit around energization button contact EN₂. The normally open contact CR–3₂ in the stepping relay reset coil circuit is closed partially completing the shunt around the manual reset button RE₁. The normally closed contact CR–3₃ in the sewing machine clutch circuit is opened preventing energization of solenoid valve SV–4 and stepping relay coil SRS. The normally open contact CR–3₄ in the indexing mechanism circuit closes partially completing the circuit to solenoid valve SV–2. The solenoid valve SV–2 is not energized at this time since contact CR–9₁ has been opened by relay CR–9. Relay CR–9 also closed contact CR–9₂ in the thread-wiper circuit partially completing the circuit to the thread-wiper solenoid TW.

The circuit remains in its present state until the first buttonhole is completely sewed. Upon completion of the first buttonhole the sewing machine clutch mechanism is disengaged opening limit switch LS–2 of the relay circuit CR–2, thus, de-energizing relay CR–2. When control relay CR–2 is de-energized two primary functions take place. First, the relay circuit CR–8 is opened by the opening of the closed contact CR–2₅, but the relay CR–8 is not de-energized for a short period of time due to the time-delay provided by capacitors C₂ and C₃. The CR–2₈ contact in the thread-wiper circuit is closed partially completing the circuit, but the thread-wiper solenoid TW is not energized since contact CR–8₃ is open. Second, after the elapse of a short time-delay relay CR–8 is de-energized closing contact CR–8₃ of the thread-wiper circuit causing the thread-wiper solenoid TW to be energized through the full wave rectifier circuit, generally designated at 174. When the thread-wiper solenoid is energized, the arcuate shaped thread engaging member 148 is lowered by the longitudinal bar carried by the rotating solenoid TW engaging the thread which was used to sew the buttonhole. The CR–8₂ contact in the control relay CR–9 circuit is opened, opening the CR–9 circuit, but the CR–9 relay is not de-energized at this time due to the time-delay circuit associated therewith. After a short time-delay the CR–9 relay is de-energized opening the contact CR–9₂ of the thread-wiper circuit de-energizing the thread-wiper solenoid for permitting the spring 151 associated with the thread engaging member 148 to raise such for pulling the cut thread out of the garment so as not to impair the movement of the garment during the indexing operation.

The contact CR–9₁ of the indexing mechanism circuit closes upon de-energizing relay CR–9 permitting the solenoid valves SV–2 and SV–5 to be energized, which causes the foot 23 of the sewing machine to be raised and, also, causes the indexing mechanism to shift the conveyor belts one increment so that the garment is shifted to the location where the next buttonhole is to be sewn. Upon completion of the first indexing operation limit switch LS–3 of the control relay circuit CR–7 opens the control relay CR–7 circuit briefly causing the relay CR–7 to be de-energized after a short time-delay caused by the capacitor C₁. When relay CR–7 is de-energized contact CR–7₁ is opened breaking the sealed in circuit to the control relay CR–7 so that reclosure of limit switch LS–3 does not energize control relay CR–7. De-energization of relay CR–7 causes contact CR–7₂ of the relay circuit CR–3 to open de-energizing relay CR–3.

The de-energization of relay CR–3 causes contact CR–3₄ of the indexing mechanism circuit to open de-energizing the solenoid valve SV–2 causing the indexing mechanism to be reset and, also, de-energizes solenoid valve SV–5 causing the sewing machine foot 23 to be lowered. The resetting of the indexing mechanism is accomplished by the changing of position of the solenoid valve SV–2 permitting air to flow in the bottom of indexing air cylinder CY–2 extending the piston and rack 93 associated therewith to their initial position.

The closing of contact CR–3₃ in the sewing machine clutch circuit again energizes solenoid valve SV–4 causing the sewing machine clutch to be engaged beginning the sewing of the second buttonhole. Such also energizes the stepping relay coil SRS moving the wiper SRS₁ to the third position of the stepping relay contacts.

A selector switch 122 is connected to one side of the stepping relay contacts and determines the number of buttonholes that will be automatically sewn. When the position of the stepping relay wiper SRS₁ matches the position of the selector switch 122, the circuit is completed to control relay CR–4 energizing such. Normally open contact CR–4₁ is closed sealing in the circuit to control relay CR–4. Normally open contact CR–4₂ in the control relay circuit CR–1 closes completing the shunt circuit around limit switch LS–1 so that the presser plate 62 can be raised without de-energizing control relay CR–1. Normally open contact CR–4₃ of the control relay circuit CR–5 closes completing the shunt circuit around energization button EN₂ energizing control relay CR–5. The energization of control relay CR–5 closes contact CR–5₁ sealing in the relay circuit CR–5.

The closing of contact CR–5₂ of the presser plate circuit causes solenoid valve SV–1 to be energized raising the presser plate 62. The control relay contact CR–4₄ of the stepping relay reset coil circuit closes completing the circuit around the manual reset button RE₁ energizing the stepping relay reset coil SRR returning the wiper SRS₁ of the stepping relay to the number 1 position. Normally closed contact CR–4₅ of the indexing mechanism circuit opens preventing such from being energized.

When the start button ST or the foot switch FS was initially pressed energizing relay CR–1, series contact CR–1₂, interposed in lead H, was closed causing current to flow through closed contact CR–11₇ energizing control relay CR–10. Relay CR–10 has remained closed throughout all of the above operation. It is noted that a time-delay circuit is associated with control relay CR–10 to provide a short delay before relay CR–10 is de-energized after contact CR–11₇ is opened. The time-delay circuit includes a pair of shunt capacitors C₆ and C₇. Capacitor C₆ is charged through a rheostat Rh₃ and a diode D₅. Diode D₆ provides a D.C. voltage for the control relay CR–10 through current limiting resistors R₅ and R₆. Normally open contacts CR–10₁ and CR–10₂ of the ejection garment circuit are closed upon energization of the control relay CR–10. When relay CR–5 was energized to raise the presser plate 62 after the sewing of the last buttonhole, contacts CR–5₄ and CR–5₅ of the ejection garment circuit were closed. Upon completion of the last buttonhole the sewing machine opens limit switch LS–2 of the control relay CR–2 circuit de-energizing relay CR–2 which closes contact CR–2₃ in the ejection garment circuit completing the circuit to the gear motor 46. The gear motor 124 drives the conveyor belt through the clutch 126 ejecting the garment from the conveyor belts. The de-energization of control relay CR–2 opens contacts CR–$2_1$ of the control relay CR–1 circuit de-energizing relay CR–1 and opening the series contact CR–$1_2$ interposed in lead H de-energizing the circuitry below that point including relay CR–10 which is de-energized after a short time-delay. When CR–10 drops out, contacts CR–$10_1$ and CR–$10_2$ of the ejection garment circuit are opened de-energizing the gear motor.

An emergency stop button ES is associated with the circuitry which upon depression halts the sewing operation. The details of the circuitry associated with the emergency stop button are discussed in connection with FIGURE 17.

Occasionally because of thread breakage or some other malfunction it is desirable to be able to resew a buttonhole without indexing the garment. The emergency stop button ES and the resew button RE may be suitably located anywhere on the table 27. Upon depression of the resew button RE, resew contact button RE$_2$ in the control relay CR–11 circuitry is closed energizing relay CR–11 causing contact CR–$11_1$ to close sealing in the relay CR–11. At the same time the depression of the resew button RE opens the contact RE$_1$ in the control relay circuit CR–5 insuring de-energization of relay CR–5. When the relay CR–5 is de-energized, the presser plate 62 is in the down position on the conveyor belts A and C due to the open contact CR–$5_2$ which prevents energization of solenoid valve SV–1. De-energization of control relay CR–5 also insures closing of the contact CR–$5_3$ in the control relay circuit CR–11. Such completes the sealed in circuit to relay CR–11. Normally open contact CR–$11_2$ of the control relay circuit CR–1 is closed causing the start button contact ST$_1$ and foot switch contact FS$_2$ to be by-passed completing the circuit to control relay CR–1. Normally open contact CR–$11_3$ of the control relay circuit CR–5 closes partially completing the circuit paralleling the energization contact EN$_2$. Normally closed contact CR–$11_4$ of the ejection garment circuit opens preventing energization of the gear motor 124 in the ejection garment circuit. Normally closed contact CR–$11_5$ of the stepping relay stepping coil circuit opens preventing energization of relay stepping coil SRS. Normally closed contact CR–$11_6$ of the indexing mechanism circuit opens preventing energization of the indexing mechanism circuit and the presser foot circuit. Normally closed contact CR–$11_7$ of the control relay circuit CR–10 is opened de-energizing control relay CR–10. Normally closed contact CR–$11_8$ of the control relay circuit CR–4 is opened preventing energization of the relay CR–4. When the control relay CR–1 is energized the buttonhole sewing operation is initiated in the same manner as previously described in the automatic buttonhole sewing operation with the exception that no indexing, counting, ejection or further sewing takes place after the buttonhole is completed.

As previously mentioned, the sewing machine is provided with a garment detection means H which detects when a garment is properly positioned beneath the needle 22 of the sewing machine before a buttonhole sewing operation commences. The garment detection means H includes a feeler wire 128 which is carried adjacent the machine foot 23 and is insulated from the machine frame in such a manner that when the machine foot 23 is lowered a garment positioned between the feeler wire 128 prevents such from making electrical contact with machine frame 23a. The machine frame 23a completes the garment detection circuit, as illustrated in the drawings. Should the garment not be under the needle 22, the feeler wire 128 would contact the machine frame 23a when the foot 23 is lowered completing an electrical circuit through contact CR–$1_3$ for operating an electronic trigger circuitry located in the box 175, and illustrated in detail in FIGURE 17. The contacting of the feeler wire 128 with the frame 23a causes the electronic trigger circuitry to energize control relay CR–6. Such is discussed more fully in connection with the detailed description of FIGURE 17. When relay CR–6 is energized such opens contact CR–$6_1$ of the control relay circuit CR–1 de-energizing relay CR–1. The de-energization of control relay CR–1 causes series contact CR–$1_2$ to open disconnecting the circuitry therebelow from the power source preventing any sewing operation from taking place. The energization of relay CR–6, also, causes normally closed relay contact CR–$6_2$ in the sewing machine clutch circuit to open preventing the energization of solenoid valve SV–4 and engagement of the clutch mechanism.

Should the emergency stop button ES be depressed while the sewing machine is operating such energizes the electronic trigger circuitry of the box 175 in the same manner as garment feeler wire 128 to stop the sewing operation. Depressing the stop button ES causes the electronic trigger circuitry located in box 175 to momentarily energize relay CR–6 causing contact CR–$6_3$ of the sewing machine emergency stop circuit to be closed. Closing of contact CR–$6_3$ energizes solenoid valve SV–3 which allows air to be supplied to the emergency stop air cylinder CY–3 to retract the piston associated therewith. The piston is in engagement with a stop mechanism in the sewing machine and when it is retracted the sewing cycle is halted immediately. The stop mechanism within the sewing machine is a conventional item.

The transformer T–3 positioned across leads B and W merely supplies voltage to the electronic trigger circuitry located in box 175. It is desirable to use transformer T–3 in order to isolate the electrical circuitry of the electronic trigger circuit from the remaining control circuitry since one side of the electronic trigger circuitry is usually grounded through the sewing machine frame.

Electronic trigger circuit

The electronic trigger circuitry located in the box 175 of FIGURE 16 is illustrated in detail in FIGURE 17. The electronic trigger circuitry cooperates with the drop wire DW and the feeler wire 128 to stop the sewing operation when such completes a circuit through the frame 23a of the sewing machine. The trigger circuitry also cooperates with the emergency stop button ES to stop the sewing operation when such is depressed.

As previously mentioned, the garment detection means H employs a feeler wire 128 as a signal device. As long as cloth is between the feeler wire 128 and the sewing machine frame 23a, the cloth acts as an insulator, preventing flow of current between lines 176 and 177. It is noted that contacts CR–$1_3$ and CR–$2_6$ are closed during the sewing operation. When the cloth is not properly positioned under the presser foot 23, after such is lowered, feeler wire 128 makes contact with frame 23a and the circuit through lines 176 and 177 is completed. Thus, feeler wire 128 is a sensing device, detecting the presence or absence of cloth between itself and frame 23a.

Because there is an inherent fire hazard in using direct open contact switching, such as feeler wire 128 and frame 23a, around flammable cloth, it is essential that the current and voltages involved in this signal circuit be very small. The possibility of injury from electrical shock to the operator of the sewing machine dictate the same conclusions. Moreover, the feeler wire 128 may tend to "bounce" when lowered thereby making initial contact with frame 23a, and then almost immediately breaking contact. Thus, it is desired to utilize a low voltage trigger circuit which will be activated by the initial contact of the feeler wire 128 with the frame.

The signal from the feeler wire 128 should trigger an impulse of a duration sufficient to energize the control relay CR–6. By using a metered impulse of such predetermined duration, there is no necessity of using a mechanical switching device to turn off the current upon energization of the control relay CR–6. The metered impulse simply expires, and the relay CR–6 is permitted to be de-energized.

The transformer T–3 isolates the trigger circuit from the power supply system and from completing a circuit through frame 23a, except when a completion of a circuit is deliberately desired. Such also steps down the voltage for the trigger circuit. The primary winding of transformer T–3 is connected between leads B and W. The secondary winding of transformer T–3 is connected by leads 178 and 179 to terminals 1 and 2 of a control panel 180. Leads 181 and 182, through a protective fuse 183, connect terminals 1 and 2 to the A.C. inputs of a bridge rectifier 184. Bridge rectifier 184, together with filter capacitor 185, impress a D.C. voltage across leads 186 and 187. As depicted, lead 187 is the positive side of the circuit.

The positive potential on lead 187 is applied through limiting resistor 188 to a connection 189 from where it is applied to the anode lead 190 of a silicon controlled rectifier 191 (hereinafter referred to as SCR 191). SCR 191 is now in the non-conducting state. Current flows from lead 187 through resistors 188, 192, connection 193, unijunction transistor 194, and resistor 195 to the negative lead 186 of the circuit. Simultaneously, current flows from lead 187 through resistor 188, connection 189, resistors 192 and 196, variable resistor 197, and connection 198, charging capacitor 199. Note that capacitor 199 is connected at one end to negative lead 186, and at the other end to connection 198. When the voltage across capacitor 199 reaches the turn-on voltage of unijunction transistor 194, capacitor 199 discharges through transistor 194 (through its emitter 200) and through resistor 195 to lead 186. This produces a momentary positive pulse on gate 201 of SCR 191, triggering SCR 191 into the conducting state. Virtually full line voltage, therefore, now appears across resistor 188, which resistor 188 limits the current flow through SCR 191 to a value with in its capacity. Because of the low resistance of SCR 191 when in the conducting state, connection 189 is at substantially the same negative potential as lead 186. Capacitor 202 now charges from positive lead 187, through line 206, terminal 3, line 205, relay CR–6, line 204, terminal 4, and line 203. Potential across unijunction transistor 194 falls to very low value.

Simultaneously, capacitors 207 and 208 have charged through current-limiting resistors 209 and 210, respectively, to the potential set by a voltage divider circuit formed by resistors 211 and 212, and unijunction transistor 213. The ohm value of resistor 212 and the ohm value of transistor 213 are selected in such a ratio as to limit the potential difference between the drop wire 128 and frame 23a to a relatively low value.

The feeler wire 128 is connected by a line 176 to terminal 7, and by means of a jumper 214, to terminal 6. The normally open emergency stop button ES is connected by line 215 to terminal 6. Terminal 6 is connected by a line 216, through a resistor 217, to lead 186. Emitter 218 of unijunction transistor 213 is connected to line 216 at connection 219 and resistor 217 is interposed between connection 219 and lead 186. The other leg of emergency stop switch ES is connected by a lead 220 to terminal 5. A line 221 connects terminal 5 to one side of capacitor 207. The other side of capacitor 207 is connected directly to lead 186. A large resistor 209 also connects line 221 to connection 222 through connection 223 interposed between resistor 212 and transistor 213. The frame 23a of the sewing machine is connected by a line 177 to terminal 8. A line 224 connects terminal 8 to a connection 225 interposed between resistor 210 and capacitor 208.

Upon closing either switch ES, drop wire DW, or the feeler wire 128, the charge on capacitor 207 or 208 is applied to emitter 218 of transistor 213 causing the transistor to being conducting which permits capacitor 207 or 208 to discharge through the transistor, junction 227, and resistor 211 applying a potential to gate 228 of SCR 229 causing SCR 229 to begin conducting. When SCR 229 is conducting, a circuit is completed for control relay CR–6. This circuit can be traced from lead 186 at point 230, through SCR 229, through line 203, to terminal 4, through line 204 to one side of the relay CR–6 from the other side of relay CR–6 through lead 205 to terminal 3, and from terminal 3 through line 206 to positive lead 187. Thus, relay CR–6 is energized by the full line voltage between leads 186 and 187. Since the voltage drop across now conducting SCR 229 is very low, capacitor 202 now discharges through SCR 229 and through SCR 191, opposing the normal current flowing through SCR 191 as described above. When the net current flow through SCR 191 becomes zero, SCR 191 reverts to the non-conducting state. Capacitor 202 now charges to almost full line potential, except that its polarity is opposite to that previously described (connection 189 now becomes positive). Simultaneously, capacitor 199 begins to charge through resistors 196, 192, and 188, and variable resistor 197 until transistor 194 reaches turn-on potential. Note that the time this requires can be controlled by changing the position of tap arm 197a of variable resistor 197. When transistor 194 reaches its turn-on potential it again triggers SCR 191 into the conducting state. Capacitor 202 now discharges through SCR 191 and SCR 229 forcing the net current through SCR 229 to zero momentarily. When the net current through SCR 229 reaches zero, SCR 229 reverts to the non-conducting state, breaking the circuit to relay CR–6. Relay CR–6, therefore, is de-energized. Note that the time the circuit to relay CR–6 remains completed is controlled by the charging time of capacitor 199. For this reason, the charging circuit of capacitor 199 can be aptly termed an electrical timing means. The charging time of capacitor 199 can in turn be controlled within limits by the setting of variable resistor 197. In order that the control cover a useful range, the variable resistor 197 should be a large percentage of the resistance in the charging circuit of capacitor 199.

In the event that drop wire DW or feeler wire 128 remains closed after initial contact with frame 23a, the small resistor 217 will hold the voltage on emitter 218 of transistor 213 below the turn-on point of the transistor, and prevent retriggering of SCR 229. However, capacitor 207 is larger than capacitor 208. Therefore, if emergency stop ES switch is closed, the resulting voltage pulse from capacitor 207 will trigger transistor 213 and SCR 229, even though drop wire DW or feeler 128 remains in contact with frame 23a. Under normal circumstances, the value selected in this example is such that the charging time of capacitor 208 will exceed the duration of contact bounce should such bouncing occur, effectively preventing refiring of the circuit due to contact bounce. Similarly, the size of resistor 209 which determines the charging time of capacitor 207 prevents refiring upon too frequent depression of the emergency stop button ES.

It is to be noted that once the feeler wire 128 and drop wire DW are again insulated from frame 23a, capacitor 208 will quickly recharge. When capacitor 208 has been recharged above the turn-on potential of transistor 213, the system is reset, and is ready to be fired again upon the next contact of drop wire DW or feeler 128 with frame 23a.

The circuit described is, as the reader will note, all solid state. There are no moving parts to wear out mechanically under great repetition. The only exceptions, drop wire DW, feeler wire 128, and relay CR–6, which lend themselves well to rugged construction for long life. Moreover, since the cricuit is designed as a "trigger circuit," the briefness of the signal, as discussed hereinabove, is no bar to its reliable function. Only the very briefest of signals is necessary to trigger the system into quickly completed action.

Pneumatic circuit

The pneumatic cicuitry for the sewing machine is illustrated in FIGURE 18. Air is supplied from an air supply through a filter 172, an oiler 173, and a pressure regulator $REG_1$ to a solenoid valve SV-1. When the solenoid valve SV-1 is de-energized air is permitted to flow therethrough into the lower end of the presser plate cylinder CY-1 causing the piston 73 associated therewith to be extended. Such causes the presser plate 62 to be lowered upon the conveyor belts A and C. Upon de-energization of the solenoid valve SV-1 air is permitted to flow in the upper end of the presser plate cylinder CY-1 retracting the piston 73 and raising the presser plate 62. When the piston 73 is retracted air is permitted to exhaust out of exhaust port $EX_1$ of the solenoid valve SV-1.

Air is being supplied through the regulator $REG_2$ and the solenoid valve SV-2 into the lower end of the indexing cylinder CY-2 causing the piston 101 associated therewith to be extended. Upon energization of the solenoid valve SV-2 air is permitted to flow into the upper end of the indexing cylinder CY-2 causing the piston 101 to be retracted which in turn causes the conveyor belts to be rotated a predetermined distance. During this operation air is permitted to exhaust out of the exhaust port $EX_2$ of the solenoid valve SV-2. Upon de-energization of the solenoid valve SV-2 air is again permitted to flow into the lower end of the indexing cylinder CY-2 extending piston 101 to its initial position. During this operation air is permitted to exhaust out of exhaust port $EX_3$ of the solenoid valve SV-2.

Air is supplied through pressure regulator $REG_3$ to the solenoid valve SV-4. When the solenoid valve SV-4 is in the de-energized state no air is permitted to flow therethrough, and a spring associated with the clutch cylinder extends the piston 25a. Upon energization of the solenoid valve SV-4 air is permitted to flow through the flow control valve $FC_2$ into an upper port of the clutch cylinder CY-4 causing the piston 25a associated therewith to be retracted. The piston engages the clutch mechanism of the sewing machine through a chain causing such to be placed in engagement. When the solenoid valve SV-4 is de-energized air is permitted to exhaust through exhaust port $EX_4$ thereof.

When solenoid valve SV-3 is in a de-energized state no air is permitted to flow to the emergency stop cylinder and a spring causes the piston associated therewith to be extended. Upon energization of the solenoid valve SV-3 air is permitted to flow into the upper port to the emergency stop cylinder CY-3 causing the spring to be retracted to stop the sewing operation. Upon de-energization of the solenoid valve SV-3 air is permitted to exhaust from the cylinder through exit port $EX_5$ of the solenoid valve SV-3.

When solenoid valve SV-5 is in the de-energized state no air is permitted to be supplied to the presser foot cylinder CY-5, and a spring causes the piston 24a associated therewith to be retracted. Upon energization of the solenoid valves SV-4 air is permitted to flow through the flow control valve $FC_1$ into the lower end of the presser foot cylinder CY-5 causing the piston 24a to be extended. When the piston 24a is extended such strikes the lever arm 24 causing the presser foot 23 of the sewing machine to be raised. Upon de-energization of the solenoid valve SV-5 air is permitted to exhaust from the cylinder through the exit port $EX_6$.

Summary of operation

After the operator has determined the number of buttonholes and the spacing between the buttonholes to be sewn on the garment she rotates the knob 120 on the selector switch 122 to align the pointer on the knob to a character carried on the switch panel 121 which corresponds to the desired number of buttonholes to be sewn on the garment. Such causes the selector switch 122 associated with the stepping relay contacts illustrated in FIGURE 16 to be placed in electrical contact with the contact corresponding to the number of buttonholes to be sewn. She then rotates the knob 107 and disc 106 so that the reference mark 108 will be aligned with a character carried on the disc 106, which corresponds to the desired spacing between the buttonholes. After the number of buttonholes and the spacing between the buttonholes has been selected the operator then pushes the energization button EN causing the solenoid valves SV-1 and SV-5 to be energized. Such in turn causes the presser plate 62 and the presser foot 23 to be raised. At this time the sewing unit is ready to receive the garment upon which the buttonholes are to be sewn. The garment is placed on the conveyor belts A and C underneath the presser foot 62 with the desired location of the first buttonhole being placed directly under the needle 22 of the sewing machine. The edge of the garment is placed adjacent a guide means 75 so as to align the garment with the needle of the sewing machine. A start button ST or a foot switch FS is then depressed which causes the presser plate 62 and the foot 23 of the sewing machine to be lowered upon the garment. The lowering of the presser plate 62 causes limit switch LS-1 to be closed which in turn causes the solenoid valve SV-4 to be energized permitting the piston 25a of the clutch cylinder CY-4 to be retracted. Retraction of the piston 25a causes the clutch mechanism of the sewing machine to be engaged. When the clutch is engaged the sewing machine begins sewing the first buttonhole on the garment.

The engagement of the clutch of the sewing machine permits the limit switch LS-2 to be closed after a brief time-delay. Such in turn causes the solenoid valve SV-4 to be de-energized permitting air to exhaust from the clutch cylinder CY-4, which in turn allows the piston 25a to be extended by a spring associated therewith. Upon completion of the first buttonhole, the sewing machine clutch mechanism is disengaged opening the limit switch LS-2. It is noted that the knife 21 was lowered to cut the buttonhole and thread which was used in sewing such after the first buttonhole was sewn on the garment. The closing of the limit switch LS-2 causes the thread removing means K carried on the sewing machine to be energized for removing the thread from the garment. The closing of the limit switch LS-2 also energizes the solenoid valves SV-2 and SV-5 causing the foot of the sewing machine to be raised and, also, causing the indexing mechanism to shift the conveyor belt one increment so that the garment is shifted to the location where the next buttonhole is to be sewn. It is noted that during the shifting operation of the conveyor belts A and C that the presser plate 62 is in the lowered position pressing the garment onto the conveyor belts. Since the surface of the presser plate is relatively smooth compared to the surfaces of the conveyor belts, the garment is permitted to move with the conveyor belts during the indexing operation. At the completion of the indexing operation the limit switch LS-3 is opened briefly. Such in turn causes solenoid valve SV-2 to be de-energized causing the indexing mechanism to be reset to its initial position. The opening of the limit switch LS-3 also in turn causes the solenoid valve SV-5 to be de-energized lowering the sewing machine foot 23.

The solenoid valve SV-4 is then energized causing the sewing machine clutch to be engaged so as to begin sewing the second buttonhole. Such also energizes the stepping relay coil SRS moving the wiper $SRS_1$ to the third position of the stepping relay contacts.

The above operation is repeated until the stepping relay wiper $SRS_1$ matches the position of the selector switch 122. When such takes place the presser plate 62 can be raised without de-energizing control relay CR-1. The stepping relay is then reset so that the wiper $SRS_1$ is returned to the number one contact. At this time a circuit is completed to the motor 124 which is energized causing the conveyor belts to be shifted to eject the garment therefrom.

It is noted that if the garment were not beneath the presser foot 23 when such was lowered the feeler wire 128 would make electrical connection with the frame 23a of the sewing machine preventing the buttonhole sewing operation from taking place. The buttonhole sewing operation would also be stopped abruptly if the emergency stop button ES were depressed.

What is claimed is:

1. A garment handling device in combination with a sewing machine capable of automatically performing a sewing operation including, a frame positioning said sewing machine in a fixed location, a substantially horizontal endless conveyor belt moving a flat garment in a linear path past the sewing machine for carrying out a sewing operation thereon, a first mounting means positioning said endless conveyor belt in fixed position relative to said sewing machine, a clamp above said conveyor belt pressing said garment against said conveyor belt as said garment is moved in said linear path, a second mounting means positioning said clamp in fixed position relative to said sewing machine, and means intermittently driving said conveyor for predetermined increments of movement in accordance with desired spacing between said sewing operation, whereby said clamp presses said garment against said conveyor belt and remains in fixed position relative to said sewing machine as said conveyor is intermittently driven.

2. The garment handling device as set forth in claim 1, wherein the surface of said conveyor belt is rough so that there is a high frictional contact between the garment and said belt and wherein said clamp has a fixed surface having a relatively low coefficient of friction for minimizing frictional engagement between said clamp and said garment, whereby the garment can be moved on said conveyor under said fixed surface while said clamp is pressing down on the garment.

3. The garment handling device as set forth in claim 1, wherein said clamp includes an elongated horizontal plate having a smooth lower surface, and means for raising and lowering said plate for the insertion of said garment on said conveyor belt.

4. The garment handling device as set forth in claim 3 including, a vertical longitudinal guide for positioning said garment on said conveyor belt, and means for placing said guide on said conveyor belt when said plate is raised and for moving said guide off said conveyor belt when said plate is lowered.

5. A garment handling device in combination with a sewing machine including: a garment transporting member shiftable horizontally between a plurality of spaced operating positions so that a stitch forming operation can be performed by said sewing machine; a garment positioning means adjacent said transporting member for positively fixing the garment on said transporting member; a shiftable cam positioned adjacent said garment positioning means, a plurality of stops carried on said cam; drive means connected to said garment transporting member for moving same between said spaced operating positions; means for shifting said cam so as to selectively place a stop on said cam in the path traveled by said drive means for accurately and positively positioning said transporting member; and means for moving said drive means a preselected distance controlled by the selected stop on said cam; whereby said movement of said drive means causes said garment transporting member to be shifted from a first position to a second position so that the sewing machine can perform stitch forming operations on successive positions on said garment.

6. A garment handling device in combination with a sewing machine capable of automatically performing a particular sewing operation including, a frame positioning said sewing machine in fixed position, a first substantially horizontal endless conveyor belt extending from a feeding position on one side of the sewing machine to the other side of the sewing machine moving a flat garment in a linear path past the sewing machine for carrying out a particular sewing operation thereon, said first conveyor belt being positioned forwardly of said sewing machine, mounting means including rotatable conveyor driving means positioning said first endless conveyor belt in fixed position relative to said sewing machine, a second conveyor belt on said mounting means aligned with said sewing machine extending adjacent but terminating short of said sewing machine, a clamp above said conveyor belts pressing said garment against said conveyor belts, and means intermittently rotating said driving means for predetermined increments of conveyor movement in accordance with desired spacing between the particular sewing operation on said garment.

7. The garment handling device as set forth in claim 6, wherein the surfaces of said conveyor belts have a relatively high coefficient of friction so that there is a high frictional engagement between the garment and the belts, and wherein said clamp has a smooth inner surface so that there is relatively low frictional engagement between said clamp and said garment, whereby the garment can be moved on said conveyor under said clamp while said clamp is pressing on the garment.

8. In an electric sewing machine being energized through an electric circuit for automatically performing a sewing operation on a garment and cutting a thread used in said sewing operation at the completion of said sewing operation including: a signal generating means connected to said sewing machine for producing a signal at the completion of said sewing operation; a rotating solenoid; a thread engaging member carried by said sewing machine adjacent said rotating solenoid so that such is shifted in the path of said cut thread for engaging same by rotating the solenoid when said solenoid is energized; means for electrically connecting said signal generating means to said rotating solenoid at the completion of a sewing operation; and means for raising said thread engaging member for pulling said cut thread out of said garment.

9. A garment handling device in combination with a sewing machine including: a garment transporting member shiftable horizontally between a plurality of spaced operating positions so that stitch forming operations can be performed by said sewing machine; a rotatable drive shaft in driving engagement with said garment transporting member; a drive gear carried on said shaft; a rack in meshed relation with said drive gear for rotating said drive shaft when shifted; a shiftable cam positioned adjacent said rack; a plurality of stops carried on said cam; means for shifting said cam so as to selectively place a stop on said cam in the path traveled by said rack for accurately and positively positioning said transporting member; a fluid operated cylinder attached to one end of said rack for shifting said rack from a first position to a second position so as to shift the garment transporting member by rotating the drive shaft; and means for supplying fluid to said cylinder at the end of a sewing operation for causing said cylinder to shift said rack from said first position to said second position.

10. A garment handling device in combination with a sewing machine capable of automatically performing a sewing operation and having an electric control circuit associated therewith comprising: a garment carrying means for moving the garment under said sewing machine so that said sewing machine can perform spaced sewing operations on said garment; drive means for shifting said garment carrying means under said sewing machine; said drive means including a power driven rack which is in driving relation with said garment carrying means; a cam having a plurality of stops thereon; and means for selectively placing one of said stops in the path traveled by said rack for limiting the movement of said rack for defining the spaced intervals between sewing operations on said garment; means coupled to said device for automatically controlling the number of sewing operations to take place on said garment; and means for automatically ejecting said garment from said garment carrying device after the last sewing operation has taken place on said garment; whereby said garment handling device is readied to receive another garment for performing a plurality of spaced sewing operations thereon.

11. A garment handling device in combination with a sewing machine capable of automatically performing a sewing operation and having an electric control associated therewith comprising: a garment carrying means for moving the garment under said sewing machine so that said sewing machine can perform spaced sewing operations on said garment; drive means for shifting said garment carrying means under said sewing machine; means having a plurality of stops thereon associated with said drive means for controlling the movement of said drive means for defining the spaced intervals between sewing operations on said garment; means coupled to said device for automatically controlling the number of sewing operations to take place on said garment; a resew circuit electrically connected in said electric control circuit of said sewing machine; means for energizing said resew circuit for repeating a sewing operation prior to said garment carrying device shifting said garment to the location of the next sewing operation; and means for automatically ejecting said garment from said garment carrying device after the last sewing operation has taken place on said garment, whereby said garment handling device is readied to receive another garment for performing a plurality of spaced sewing operations thereon.

12. A garment handling device in combination with a sewing machine capable of automatically performing a sewing operation and having an electric control circuit associated therewith comprising: a garment carrying means for moving the garment under said sewing machine so that said sewing machine can perform spaced sewing operations on said garment; drive means for shifting said garment carrying means under said sewing machine; means having a plurality of stops thereon associated with said drive means for controlling the movement of said drive means for defining the spaced intervals between sewing operations on said garment; a clamping means carried adjacent said garment carrying means for pressing said garment in fixed relation to said garment carrying means while permitting the garment to pass under the clamping means as said garment is shifted with said garment carrying means; means coupled to said device for automatically controlling the number of sewing operations to take place on said garment; and means for automatically ejecting said garment from said garment carrying device after the last sewing operation has taken place on said garment, whereby said garment handling device is readied to receive another garment for performing a plurality of spaced sewing operations thereon.

13. A garment handling device in combination with a sewing machine capable of automatically performing a sewing operation and having an electric control circuit associated therewith comprising: a garment carrying means for moving the garment under said sewing machine so that said sewing machine can perform spaced sewing operations on said garment; drive means for shifting said garment carrying means under said sewing machine; means having a plurality of stops thereon associated with said drive means for controlling the movement of said drive means for defining the spaced intervals between sewing operations on said garment; a thread removing means carried on said sewing machine for removing a thread from the garment after a sewing operation has taken place, said thread removing means including an arm for engaging said thread, and a rotating solenoid pivoting said arm when energized so that said arm engages said thread for removing such from the garment; means coupled to said device for automatically controlling the number of sewing operations to take place on said garment; and means for automatically ejecting said garment from said garment carrying device after the last sewing operation has taken place on said garment, whereby said garment handling device is readied to receive another garment for performing a plurality of spaced sewing operations thereon.

References Cited

UNITED STATES PATENTS

| | | | |
|---|---|---|---|
| 2,354,559 | 7/1944 | Thornton | 112—68 |
| 2,588,845 | 3/1952 | Kadervek | 198—135 XR |
| 2,546,831 | 3/1951 | Newell. | |
| 2,845,885 | 8/1958 | Scarrone | 112—10 |
| 2,910,027 | 10/1959 | Winz | 112—219 |
| 2,989,934 | 6/1961 | Zeitlin. | |
| 3,083,653 | 4/1963 | McGill. | |
| 3,329,110 | 7/1967 | Bergeron. | |

JAMES R. BOLER, *Primary Examiner.*

U.S. Cl. X.R.

112—203